(12) United States Patent
Di Girolamo et al.

(10) Patent No.: US 10,390,367 B2
(45) Date of Patent: Aug. 20, 2019

(54) RANDOM ACCESS IN DYNAMIC AND SHARED SPECTRUMS

(71) Applicant: InterDigital Patent Holdings, Inc., Wilmington, DE (US)

(72) Inventors: Rocco Di Girolamo, Laval (CA); Martino M. Freda, Laval (CA); Jean-Louis Gauvreau, La Prairie (CA); Scott Laughlin, Montreal (CA); Debashish Purkayastha, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/249,581

(22) Filed: Jan. 16, 2019

(65) Prior Publication Data

US 2019/0150195 A1 May 16, 2019

Related U.S. Application Data

(63) Continuation of application No. 15/852,643, filed on Dec. 22, 2017, now Pat. No. 10,201,013, which is a
(Continued)

(51) Int. Cl.
*H04W 74/08* (2009.01)
*H04W 72/04* (2009.01)
*H04W 16/14* (2009.01)

(52) U.S. Cl.
CPC ....... *H04W 74/0808* (2013.01); *H04W 16/14* (2013.01); *H04W 72/0446* (2013.01)

(58) Field of Classification Search
CPC ......... H04W 72/0446; H04W 74/0808; H04W 16/14
USPC ......................................................... 455/454
See application file for complete search history.

(56) References Cited

U.S. PATENT DOCUMENTS 8,315,641 B2 11/2012 Chun et al.
2007/0254656 A1 11/2007 Dalsgaard
(Continued)

FOREIGN PATENT DOCUMENTS

WO WO 2011/072251 A2 6/2011

OTHER PUBLICATIONS

3rd Generation Partnership Project (3GPP), TS 36.213 V10.4.0, "Technical Specification Group Radio Access Network, Evolved Universal Terrestrial Radio Access (E-UTRA), Physical Layer Procedures (Release 10)", Dec. 2011, pp. 1-125.
(Continued)

*Primary Examiner* — Juan A Torres
(74) *Attorney, Agent, or Firm* — Condo Roccia Koptiw LLP

(57) ABSTRACT

Systems and methods for using a communication system in a spectrum are provided. For example, a random access or RACH procedure may be performed where the random access or RACH procedure may be configured to reduce secondary interference and/or to be used in a pixel-based environment. The random access or RACH procedure may include selecting a RACH preamble; sending a RACH preamble and/or format information; determining a transmission power of the RACH preamble and/or the format information; determining a random access radio network temporary identifier (RA-RNTI) and preamble ID associated with the RACH preamble; and/or selecting a physical RACH (PRACH).

16 Claims, 32 Drawing Sheets

Related U.S. Application Data continuation of application No. 15/147,274, filed on May 5, 2016, now Pat. No. 9,894,686, which is a continuation of application No. 14/380,489, filed as application No. PCT/US2013/027540 on Feb. 24, 2013, now Pat. No. 9,363,829.

(60) Provisional application No. 61/746,797, filed on Dec. 28, 2012, provisional application No. 61/603,002, filed on Feb. 24, 2012.

(56) References Cited

U.S. PATENT DOCUMENTS

2012/0039284 A1 2/2012 Barbieri et al.
2013/0003573 A1 1/2013 Reznik et al.

OTHER PUBLICATIONS

3rd Generation Partnership Project (3GPP), TS 36.321 V10.4.0, "Technical Specification Group Radio Access Network, Evolved Universal Terrestrial Radio Access (E-UTRA), Medium Access Control (MAC) Protocol Specification (Release 10)", Dec. 2011, pp. 1-54.
3rd Generation Partnership Project (3GPP), TS 36.331 V10.4.0, "Technical Specification Group Radio Access Network, Evolved Universal Terrestrial Radio Access (E-UTRA), Radio Resource Control (RRC), Protocol Specification (Release 10)", Dec. 2011, pp. 1-296.
European Telecommunications Standards Institute (ETSI), TR 103 067 V0.0.4, "Reconfigurable Radio Systems (RRS), Feasibility Study on Radio Frequency (RF) Performances for Cognitive Radio Systems Operating in UHF TV Band White Spaces", Sep. 2011, pp. 1-44.

RANDOM ACCESS IN DYNAMIC AND SHARED SPECTRUMS

CROSS-REFERENCE TO RELATED APPLICATIONS

This application is a continuation of U.S. patent application Ser. No. 15/852,643, filed Dec. 22, 2017; which is a continuation of U.S. patent application Ser. No. 15/147,274, filed May 5, 2016, now U.S. Pat. No. 9,894,686, issued on Feb. 13, 2018; which is a continuation of U.S. patent application Ser. No. 14/380,489, filed Aug. 22, 2014, now U.S. Pat. No. 9,363,829, issued on Jun. 7, 2016; which is the National Stage entry under 35 U.S.C. § 371 of PCT Application No. PCT/US2013/027540, filed Feb. 24, 2013, which claims the benefit of U.S. Provisional Patent Application No. 61/603,002, filed Feb. 24, 2012; and U.S. Provisional Patent Application No. 61/746,797, filed on Dec. 28, 2012; the contents of which are hereby incorporated by reference herein.

BACKGROUND

Today, communication systems such as communication systems that implement LTE (e.g., a LTE system) use various spectrums such as a licensed spectrum, an unlicensed spectrum, a dynamic spectrum, a shared spectrum, or a combination of these spectrums. For example, an entrant may not have access to a licensed spectrum and, instead, may deploy a LTE system in a shared spectrum such as TV White Space (TVWS) or Industrial, Scientific, and Medical (ISM) bands. Such a spectrum may be broad and may include large numbers of channels often occupied by other technologies that make network discovery challenging. Since channels are shared with other operators and other radio access technologies (RATs), such channels are often polluted with localized interferers such as controllable and uncontrollable interferers. Additionally, the availability of such channels often changes over a short period. Accordingly, a LTE system and the bands associated with the LTE system may often have to be reconfigured. These reconfigured bands may be referred to as a dynamic and shared spectrum. Unfortunately, cells such as small cells deployed in a dynamic and shared spectrum may not be able to anchor the LTE system to a licensed spectrum. As a result, mobility management may be a challenge, and the LTE system may need to support both uplink and downlink.

To support the uplink, a random access procedure and/or channel, such as a random access channel (RACH), may be used. Unfortunately, wireless transmit/receive units (WTRUs), such as user equipment (UE), and interferences associated therewith, such as secondary WTRUs and interferences that may be used in a communication system, may provide a number of problems for a random access procedure. For example, RACH preamble transmissions may not be recoverable, as a result of uncontrollable interference (UL transmission). As an example, a WTRU may poorly estimate path loss due to uncontrollable interference (DL transmission), resulting in excessive transmit power for a RACH preamble and potential interference to other RACH transmissions from the same cell. As an example, current RACH techniques have gaps to take into account timing uncertainty, and such gaps may be a problem in that they may allow secondary user transmissions time to access the dynamic and shared spectrum. For LTE standalone solutions using, for example, a coexistence gap mechanism, a RACH capacity may not be enough to support all IDLE mode WTRUs (e.g., where the dynamic and shared spectrum is narrow, as is the case in TVWS, where the spectrum allows for a maximum LTE carrier bandwidth of 5 MHz). Also, for LTE standalone solutions, the coexistence gap mechanism may interfere with the LTE random access procedure (e.g., a Release 10 random access procedure) that may have timing requirements that permit operation of the 6 TDD UL/DL configurations including the random access response window (e.g., a window during which the WTRU expects a response for its random access preamble transmission) that may not be received.

SUMMARY

Systems and methods associated with dynamic and spectrum management (DSM) in a communication system, such as a LTE system, may be provided. For example, different systems and methods to support LTE random access transmission in a channel shared with other secondary users including secondary WTRUs or interfaces may be provided. The systems and methods may generally be applied to wireless communication systems that may implement LTE (e.g., LTE systems) to, for example, improve a robustness of a RACH channel used therein.

For example, a random access or RACH procedure may be performed where the random access or RACH procedure may be configured to reduce secondary interference and/or may be configured to be used in a pixel-based environment. The random access or RACH procedure may include selecting a RACH preamble. The random access or RACH procedure may also include sending the RACH preamble and/or format information. The random access or RACH procedure may also include determining a transmission power for the RACH preamble and/or the format information. The random access or RACH procedure may also include determining a random access radio network temporary identifier (RA-RNTI) and preamble ID associated with the RACH preamble. The random access or RACH procedure may also include selecting a physical RACH (PRACH). The random access or RACH procedure may include any combination of the above steps.

The Summary is provided to introduce in a simplified form a selection of concepts that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

DETAILED DESCRIPTION

A detailed description of illustrative examples will now be described with reference to the various Figures. Although this description provides a detailed example of some possible implementations, it should be noted that the details are intended to be exemplary and in no way limit the scope of the application.

Figure 1A:
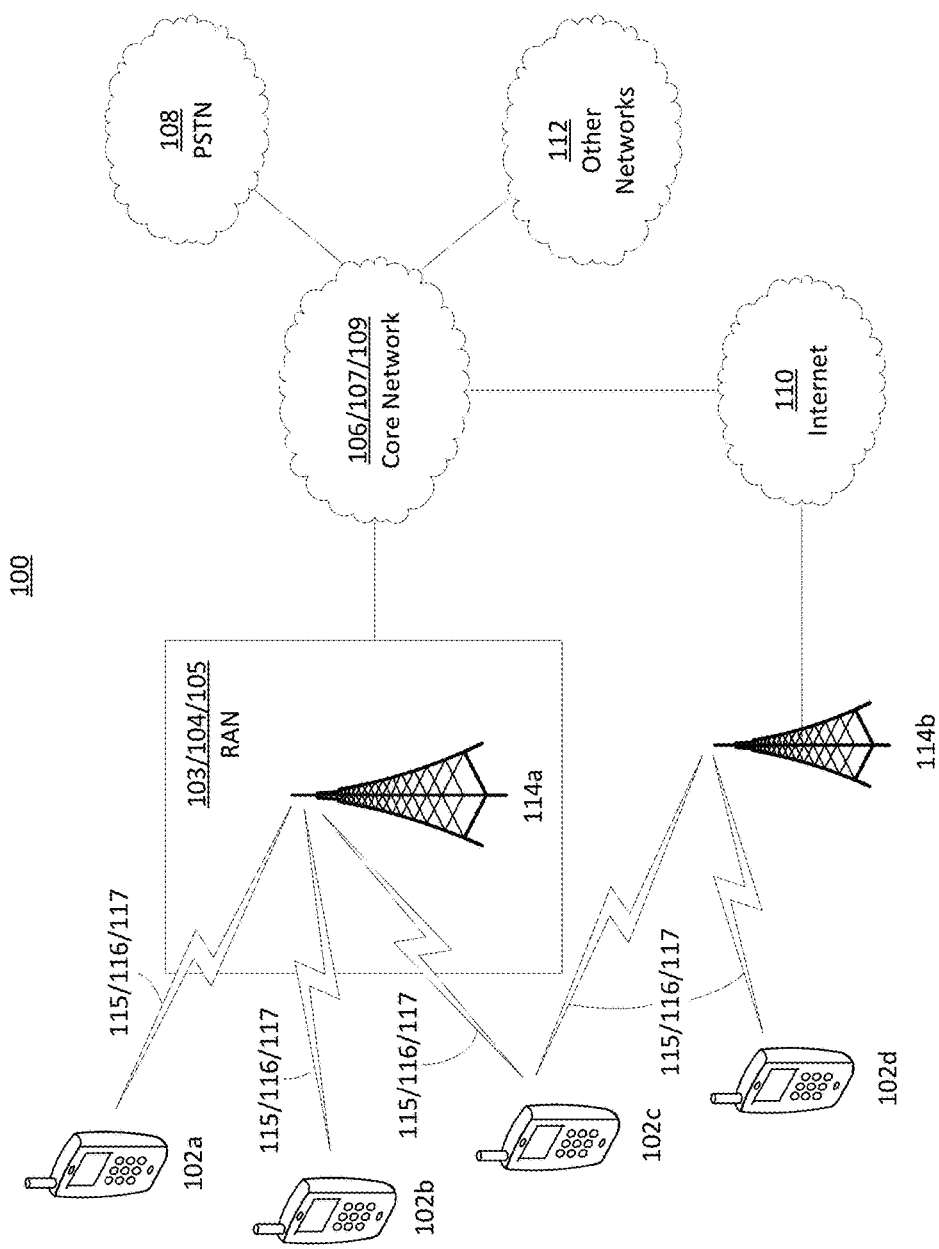
FIG. 1A depicts a diagram of an example communications system in which one or more disclosed examples may be implemented.

FIG. 1A is a diagram of an example communications system 100 in which one or more disclosed examples may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and/or other networks 112, though it will be appreciated that the disclosed examples contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one example, the base station 114a may include three transceivers, i.e., one for each sector of the cell. In another example, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

The base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. The base station 114b and the WTRUs 102c, 102d may implement a radio technology such as IEEE 802.11 to establish a wireless local area network (WLAN). The base station 114b and the WTRUs 102c, 102d may implement a radio technology such as IEEE 802.15 to establish a wireless personal area network (WPAN). The base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP Internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
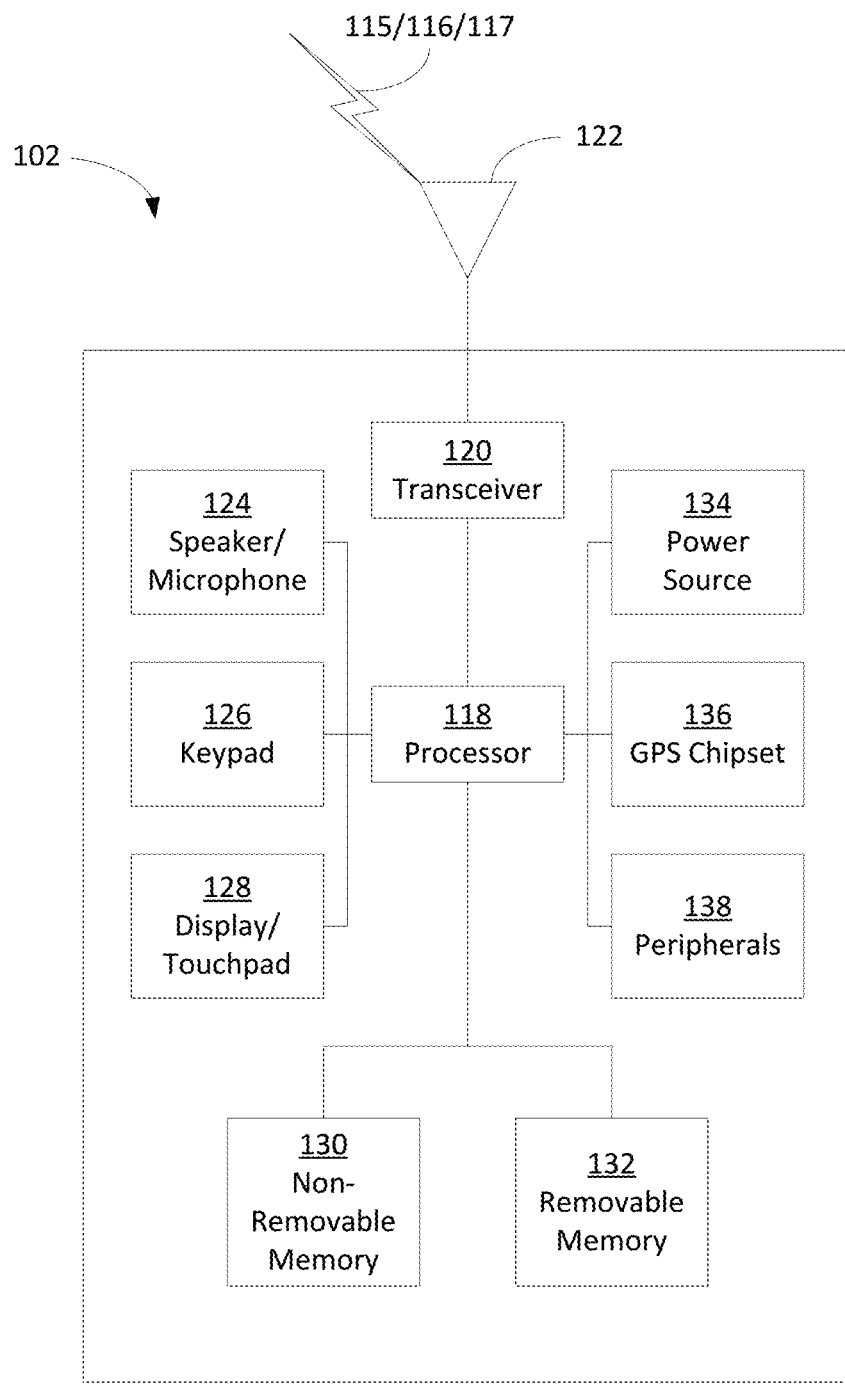
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
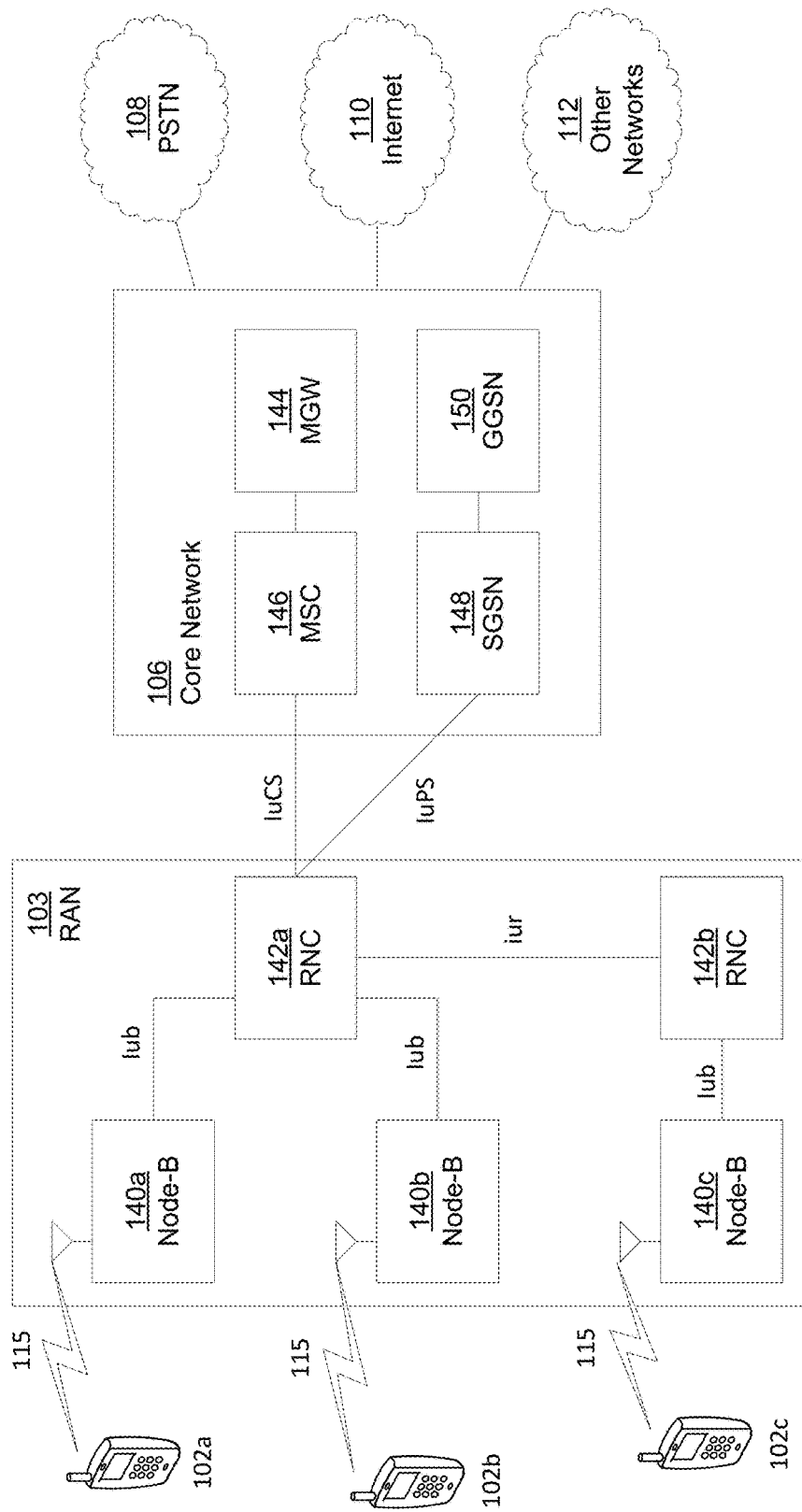
FIG. 1C depicts a system diagram of an example radio access network and an example core network that may be used within the communications system illustrated in FIG. 1A.

FIG. 1C depicts a system diagram of the RAN 103 and the core network 106 according to an example. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs.

As shown in FIG. 1C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
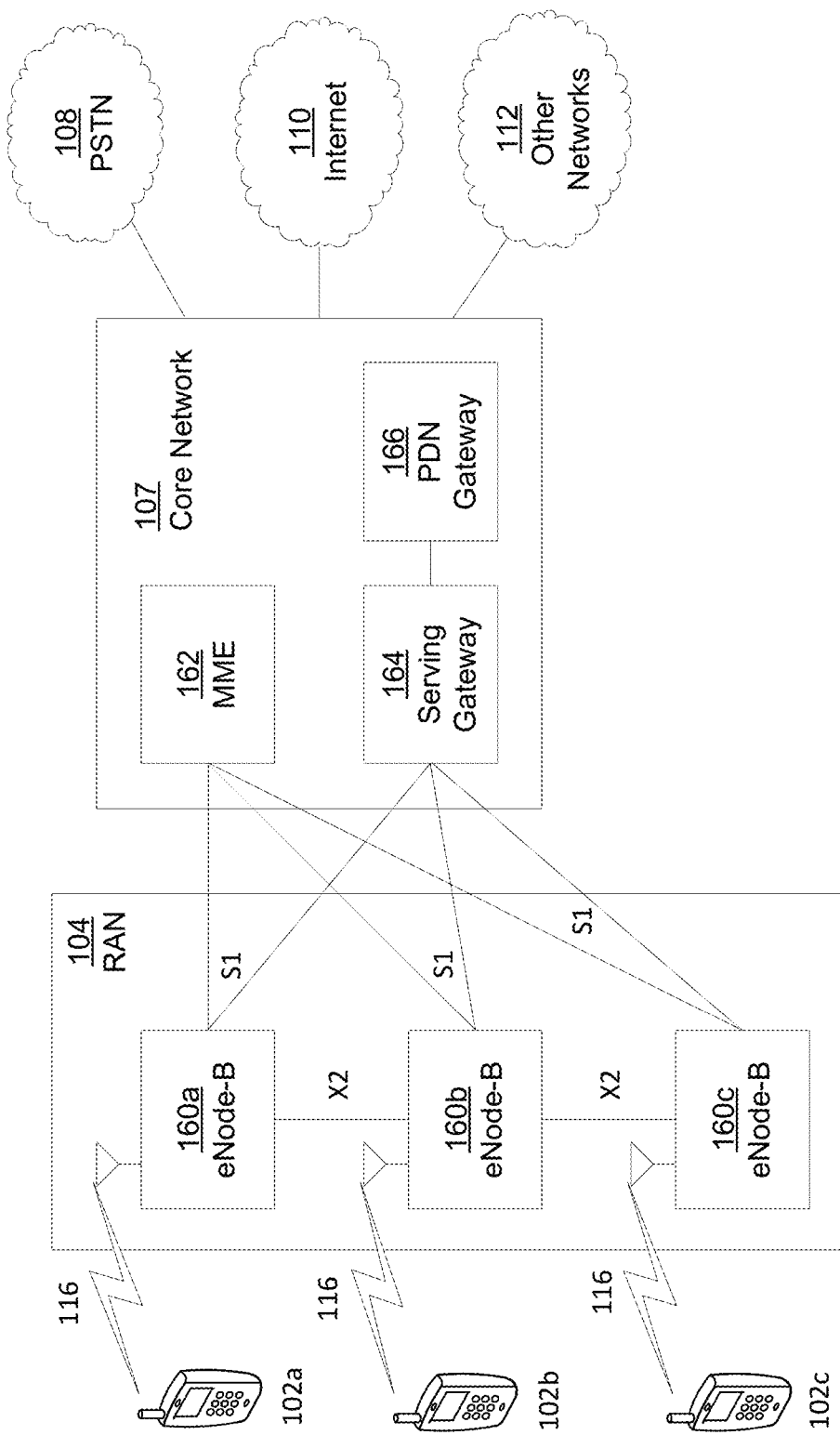
FIG. 1D depicts a system diagram of an example radio access network and an example core network that may be used within the communications system illustrated in FIG. 1A.

FIG. 1D depicts a system diagram of the RAN 104 and the core network 107 according to an example. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs. The eNode-Bs 160a, 160b, and/or 160c may each include one or more transceivers for communicating with the WTRUs 102a, 102b, and/or 102c over the air interface 116. The eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 1E:
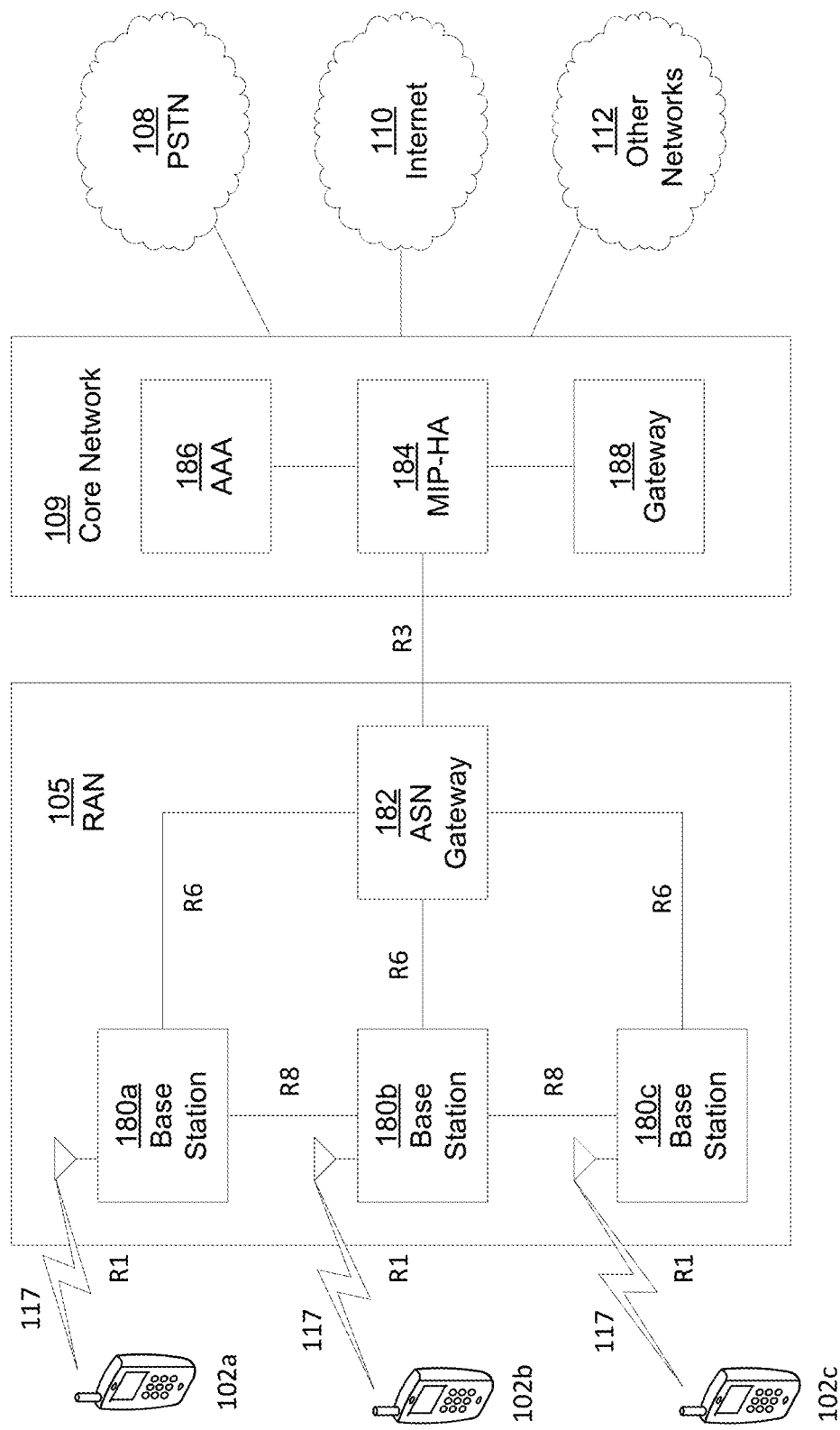
FIG. 1E depicts a system diagram of an example radio access network and an example core network that may be used within the communications system illustrated in FIG. 1A.

FIG. 1E depicts a system diagram of the RAN 105 and the core network 109 according to an example. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 1E, the RAN 105 may include base stations 180a, 180b, and/or 180c, and an ASN gateway 182, though it will be appreciated that the RAN 105 may include any number of base stations and ASN gateways. The base stations 180a, 180b, and/or 180c may each be associated with a particular cell (not shown) in the RAN 105 and may each include one or more transceivers for communicating with the WTRUs 102a, 102b, and/or 102c over the air interface 117. The base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional landline communications devices. In addition, the gateway 188 may provide the WTRUs 102a, 102b, and/or 102c with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Systems and methods for supporting random access transmissions including random access channels (RACHs) may be provided. In an example, a procedure may be provided in which the WTRU may listen to a channel during a RACH subframe, for example, before sending an LTE RACH preamble, and may send the RACH preamble if the channel may be free or may become free during the RACH subframe. The WTRU may also send the RACH preamble if such a transmission fits in the time remaining in a RACH opportunity that may include single or multiple subframes. The sensing may also use feature detection.

A procedure may be provided in which a WTRU may send consecutive and small RACH preambles within a single RACH subframe. The number of preambles may depend on time remaining after the medium may be sensed free.

A procedure may also be provided in which a WTRU may send a single small RACH preamble in the RACH subframe. The time of transmission of such a preamble may be randomly selected to minimize the possibility of collision between different WTRUs.

A procedure may also be provided in which a WTRU may take a RACH transmission time within the RACH subframe into account prior to adjusting the timing advance sent by the base station. The timing advance may be sent assuming a RACH transmission at the start of a subframe.

A procedure may further be provided in which a base station may rely on connected mode WTRUs to force secondary users to defer transmissions associated therewith, for example, by sending a known transmission in the UpPTS portion of the special subframe, by sending a known packet in a randomly selected resource block in a special reserved subframe, and/or by sending a busy indication on some sub-carriers or resource blocks according to a fixed and known pattern.

A procedure may be provided in which a preamble may be repeated over an extended random access transmit window (e.g., over multiple subframes) and where the RA-RNTI may be based on the last subframe in the window.

A procedure may also be provided in which a base station may be capable of detecting a preamble collision based on pattern of preambles received in an extended random access transmit window or timing adjustment values such that collisions may be resolved.

A procedure may be provided in which carrier aggregation (CA) capable WTRUs may camp on multiple cells and may send or receive RACH preamble over multiple cells possibly staggered in time and possibly using same or different preambles.

A procedure may also be provided in which an eNB that may receive one or more RACH preamble transmissions on multiple cells may select a cell (e.g., the best cell) for sending the downlink preamble response message.

Furthermore, a procedure may include providing (e.g., transmitting and/or sending) a WTRU with pixel information and pixel-based transmit power information through, for example, system information. According to an example, a set of procedures may further be provided for a WTRU to send location information to an eNB (e.g., through RACH preambles or as part of a RACH L2/L3 message) such that the eNB may use such location information to provide the WTRU with pixel-based transmit power information.

A random access or RACH method (e.g., procedure or operation) that may be used in a communication system, such as an LTE system may be used as an uplink mechanism for one or more of a number of reasons. A random access or RACH method may be used for initial access when establishing an RRC connection and/or for re-establishing a radio link after a radio link failure. A random access or RACH method may also be used for handover when uplink synchronization may be used for a new target cell. A random access or RACH method may also be used for establishing uplink synchronization if UL or DL data may arrive when a terminal may be RRC connected and uplink may not be synchronized. A random access or RACH method may also be used for positioning. Further, a random access or RACH method may be used for transmitting a scheduling request if no dedicated scheduling request resource may be configured. A random access or RACH method may be used for any combination of the above or other reasons.

Figure 2:
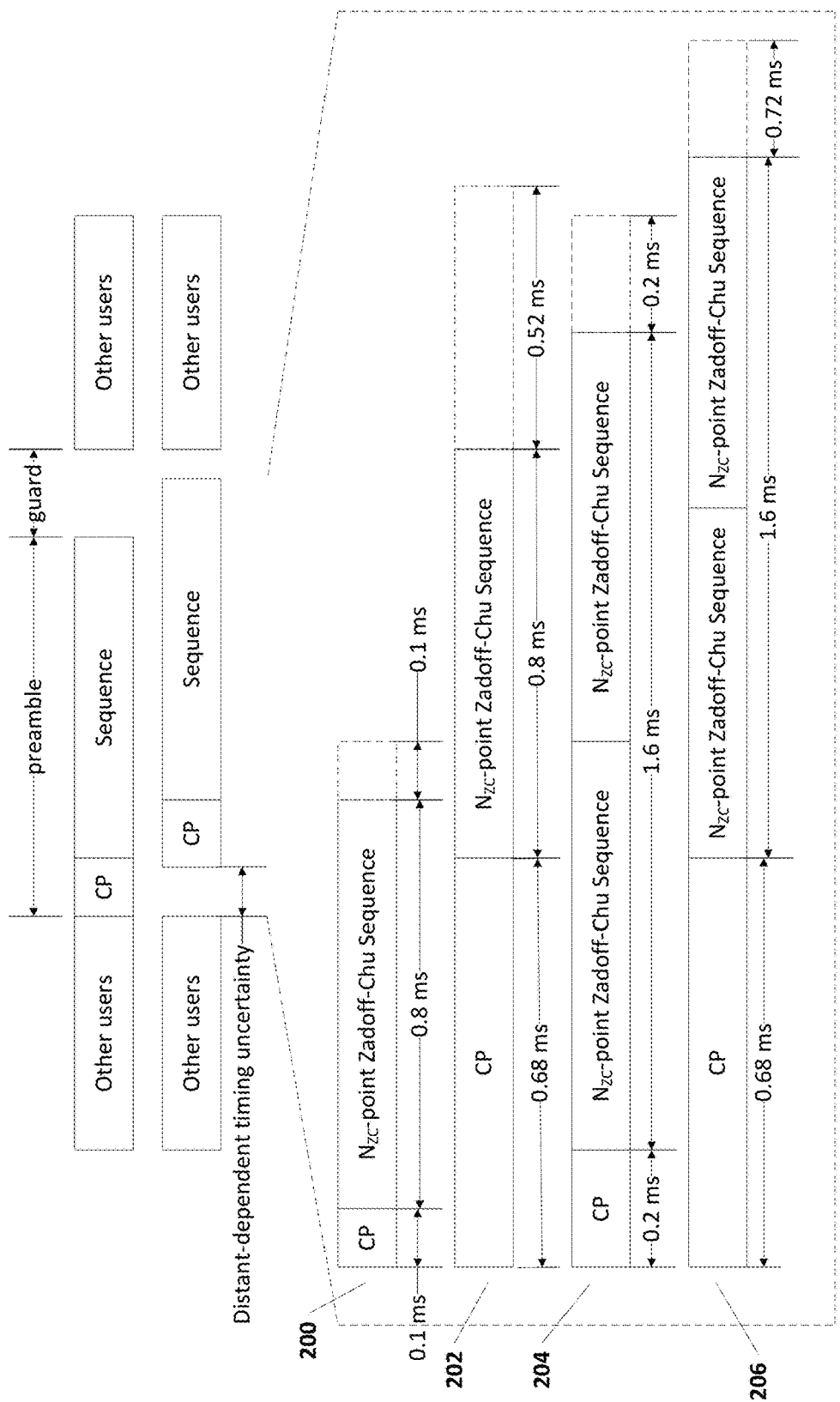
FIG. 2 depicts an example of random access formats that may be used in a communication system, such as a LTE system.

A RACH method that may be used in a communication system, such as a LTE system, may be designed, keeping in mind low latency, good detection probability at low SNR, minimum overhead, and minimum interference generated to adjacent scheduled Physical Uplink Shared Channel/Physical Uplink Control Channel (PUSCH/PUCCH) transmission. A WTRU that may be used in such a communication system may transmit a random access (RA) preamble during a RACH attempt. The RA preamble may include a Zadoff-Chu sequence that may have suitable auto and cross correlation properties. An eNB that may be used in such a communication system may also have the flexibility to use one of a number, e.g., 5 RA preamble formats. FIG. 2, for example, depicts four Preamble Formats 200, 202, 204, and 206. Each preamble may be preceded with a cyclic prefix (CP). Different formats may be used depending on a size of the cell. Preamble format 200, for example, may be used with a 1 ms window. Preamble formats 202 and 204 may be used with a 2 ms window. Preamble format 206 may be used with a 3 ms window.

Each cell may have a number of random access opportunities, for example, each of which may occupy, e.g., six consecutive resource blocks. For FDD, there may be one random access opportunity per subframe, but the configuration may have multiple random access opportunities per frame. To deal with a potential asymmetric UL/DL frame structure, a Time-Division Duplex (TDD) multiple random access opportunities may exist per subframe (e.g., up to 6). Details about a random access opportunity may be broadcast in system information through an Information Element (IE), such as a prach-ConfigurationIndex, for example.

Figure 3:
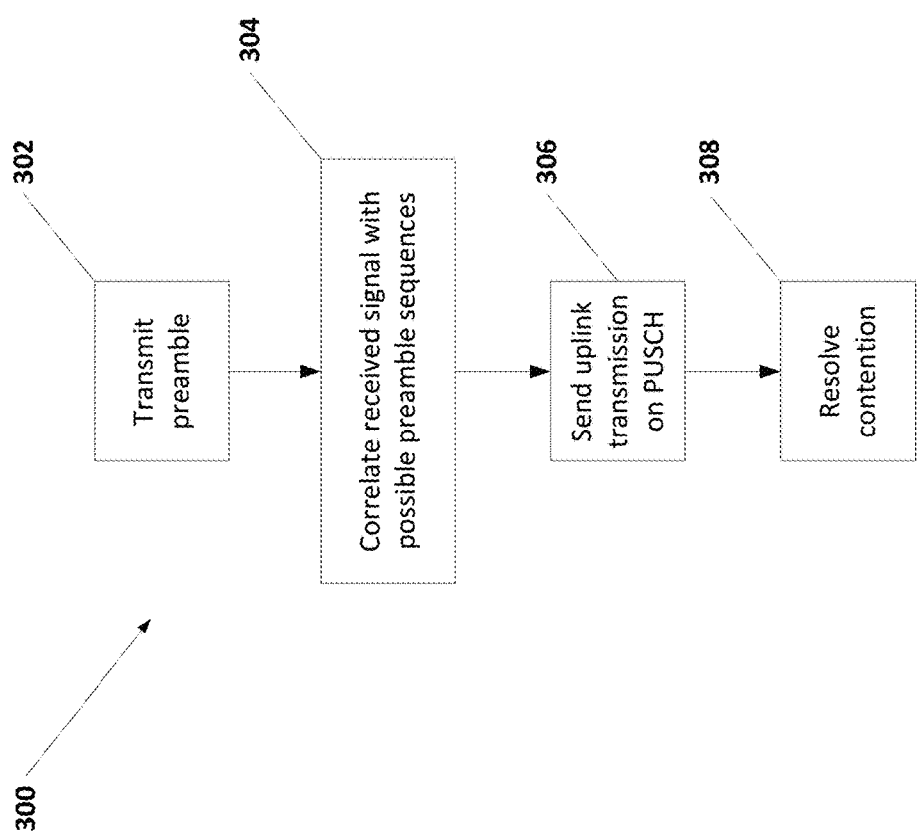
FIG. 3 is a process flow diagram illustrating an example RACH method or procedure.

FIG. 3 illustrates a RACH method or procedure 300 that may be used or implemented in a communication system. At 302, a WTRU may transmit a preamble. Details for such a preamble transmission may be broadcast in a cell's system information, e.g., "preamble set," "transmission resources and opportunity," and/or "RA format." The WTRU may randomly select "preamble" and "opportunity" and may generate a particular preamble format. The WTRU may also determine the transmit power for such a preamble based on a path loss calculation from a DL reference signal and/or broadcast parameters, such as desired received power (SINR), power ramping step, preamble-based offset, and the like.

The eNB may detect several simultaneous preamble transmissions in the same time frequency PRACH resources. Based on a selected opportunity, the WTRU may be assigned an RA-RNTI. The RA-RNTI may be associated with the PRACH in which the Random Access Preamble may be transmitted, RA-RNTI=1+t_id+10*f_id, where t_id may be the index of the first subframe of the specified PRACH (0≤t_id<10), and f_id may be the index of the specified PRACH within that subframe, in ascending order of frequency domain (0≤f_id<6).

At 304, an eNB may correlate a received signal in each PRACH opportunity with the possible preamble sequences. As a result of such a correlation, the eNB may correctly detect multiple preambles. It may be possible that two WTRUs used the same preamble in the same transmission opportunity (e.g., resulting in a collision). Such a collision may resolved at 308 (e.g., contention resolution). Upon detection of a preamble in a transmission opportunity, the eNB may determine a RA-RNTI. The eNB may then signal one or more of the following to the WTRU (addressed to the RA-RNTI): timing adjustment information; uplink grant to the UE; preamble identifier; and/or temporary C-RNTI.

For example, the WTRU may monitor a PDCCH for Random Access Response(s) identified by the RA-RNTI within the RA Response window. The RA Response Window may start at a subframe that includes the end of the preamble transmission plus three subframes and may have a length of "ra-ResponseWindowSize" subframes (see Table 1 below). If the RA Response may not be received within the configured time window, the WTRU may retransmit the preamble after a suitable backoff, and with a configured ramp up in transmit power. If the RA Response may be found in the configured time window, the WTRU may check for a match in the Preamble Identifier. A match may imply a successful random access response. In such a case, the WTRU may apply the Timing Advance and may process the UL grant to send the L3 message (e.g., RRC Connection Request, TA Update). At such a point, a collision may occur in the RACH transmission. If there may be no match, the WTRU may declare a random access failure and may retransmit the preamble after a suitable backoff, and with a configured ramp up in transmit power.

TABLE 1

Random Access Response Window Configuration

| ra-ResponseWindowSize | ENUMERATED {sf2, sf3, sf4, sf5, sf6, sf7, sf8, sf10} |
|---|---|

At 306 (e.g., of the RACH method 300), the WTRU may use the UL grant to send the uplink transmission on PUSCH (e.g., HARQ may be used for such a transmission). The WTRU may also send the temporary C-RNTI allocated by eNB and the C-RNTI/S-TMSI if the WTRU may already have one or 48-bit WTRU identity (IMSI). A 48-bit WTRU identity may facilitate contention resolution. In case of a collision, several WTRUs may each interpret that the grant may be for them and may respond with a L3 message.

According to an example, the base station may choose one of the mobile identities. If there may be no collision at 304, one mobile identity may be available to the UE. The eNB may respond with the identity of the selected WTRU in a contention resolution message. The WTRU may acknowledge such a reception (e.g., through HARQ feedback) that may complete the random access procedure (e.g., RACH method). In case of a collision, the WTRU that may not receive the contention resolution message may consider such a transmission a failure and may reattempt a different (or new) RACH transmission.

Figure 4:
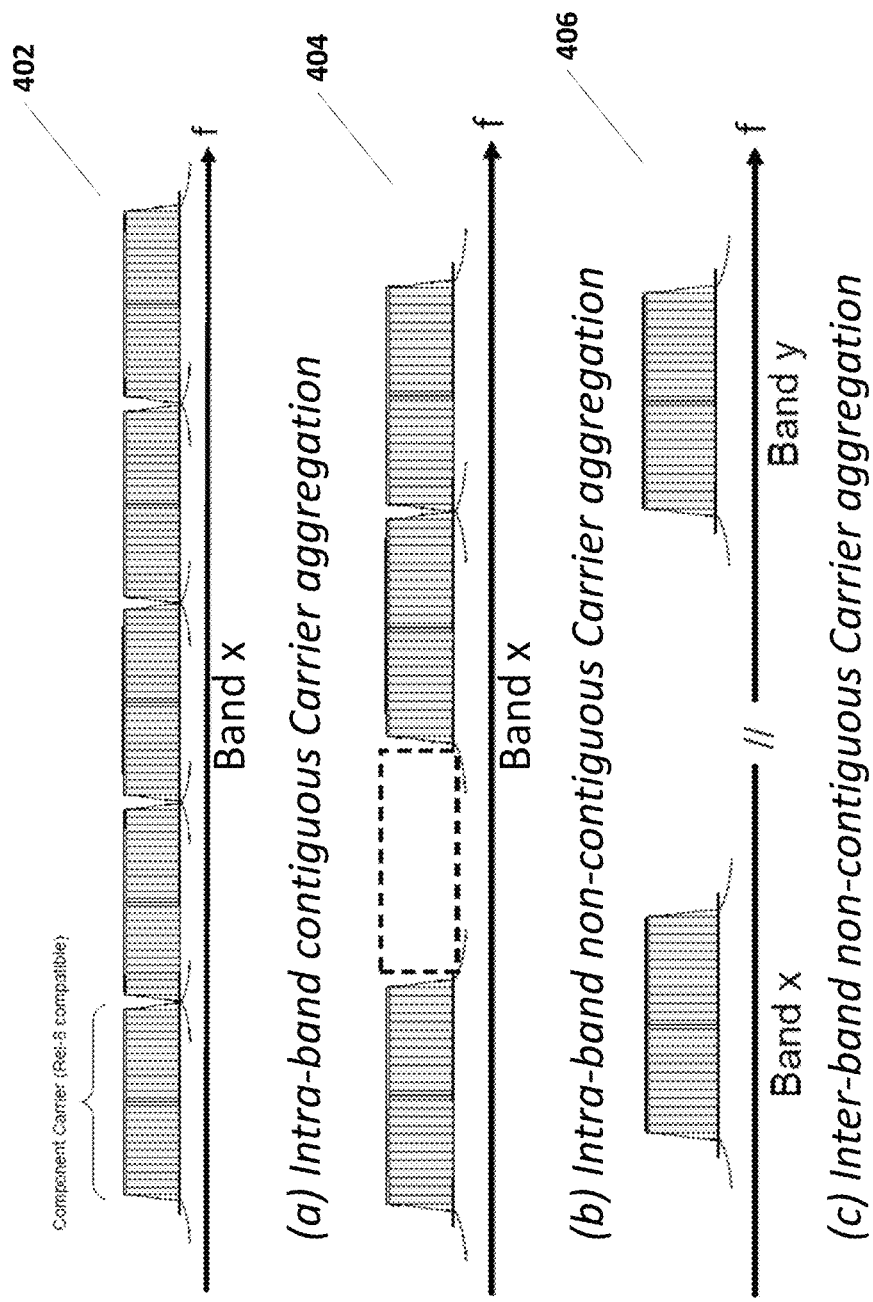
FIG. 4 depicts an example of carrier aggregations that may be used herein.

Two or more (e.g., up to 5) component carriers (CCs) in LTE, such as LTE-Advanced, may be aggregated to support wider transmission bandwidths up to 100 MHz. For example, a UE, depending on the capabilities associated therewith, may simultaneously receive or transmit on one or more CCs. The WTRU may also be capable of aggregating a different number of differently sized CCs in an uplink (UL) or a downlink (DL). Carrier aggregation (CA) may be supported for both contiguous and non-contiguous CCs. Three examples may be used as shown in FIG. 4. For example, as shown at 402, intra-band contiguous CA may be used where multiple adjacent CCs may be aggregated to produce contiguous bandwidth wider than 20 MHz. As shown at 404, intra-band non-contiguous CA where multiple CCs that may belong to the same bands (but may not be adjacent to one another) may be aggregated and used in a non-contiguous manner. As shown at reference numeral 406, inter-band non-contiguous CA may be used where multiple CCs that may belong to different bands may be aggregated. These CA techniques may be used individually or in combination with one another.

CA, such as CA LTE-A included in Release 10 3GPP, may increase a data rate achieved by a communication system such as a LTE system by allowing a scalable expansion of the bandwidth delivered to a user by allowing simultaneous utilization of the radio resources in multiple carriers. CA may also enable or allow backward compatibility of the system and legacy WTRUs (e.g., Release 8 and 9 compliant WTRUs) such that the WTRUs may function within a system such as an LTE system with CA deployed (e.g., where Release 10 with CA is deployed).

A number of potential options, methods, or techniques may be available for the potential use of the dynamic and shared spectrum (e.g., TVWS, ISM or other LE) bands. For example, some operators may rely on using the unlicensed band for CA such that resulting component carriers may be used to create supplementary cells (SuppCells) that may be aggregated with the primary cell (PCell). A communication system, such as an LTE system, may dynamically change a SuppCell from one unlicensed frequency channel to another. The use of such a change, which may not be present in an example of a communication system, such as an LTE-A system compliant with, for example, Release 10, may be due to a presence of interference and potentially primary users in unlicensed bands. For example, a strong interference such as a microwave oven or a cordless phone may make a particular channel in an ISM band unusable for data transmission. In addition, when dealing with TVWS channels as unlicensed channels, a user of such channels may evacuate a channel upon the arrival of a system that may have exclusive rights to use that channel (e.g., TV broadcast or wireless microphone in the case of the TVWS). Furthermore, the nature of unlicensed bands and an increase in the number of wireless systems that may make use of such bands may inherently result in relative quality of channels within a licensed band changing dynamically. To adjust to this, a communication system such as an LTE system performing CA may be able to dynamically change from a SuppCell in an unlicensed channel to another in order or to reconfigure itself in order to operate on a different frequency.

Additionally, some operators may deploy (e.g., may want to deploy) cellular technology in areas where there may be little or no macro cell coverage. The cost and return on investment of extending macro coverage to these areas may not make such an approach viable. Instead, such operators may decide to deploy a standalone TVWS solution (e.g., no licensed carrier) using small cells to manage a coverage hole.

Some operators may also deploy (e.g., may want to deploy) a standalone solution as an alternative to roaming. For example, a particular location operator (e.g., a North American operator) may rely on a standalone deployment scenario in a different location operator (e.g., a European operator) such that the different location operator (e.g., the European operator) may be bypassed and may potentially offer savings to end customers.

Some operators or traditional operators may also benefit (or may want to benefit) from deploying LTE in dynamic and shared spectrum for a number of reasons including: mitigating and avoiding small cell to macro cell interference, for example, by using dynamic and shared spectrum instead of a licensed spectrum in the small cell layer; using tiered service(s) including small cells that may be deployed to service low mobility applications such as M2M; and/or capacity enhancements.

Some new operators (e.g., new entrants) may use unlicensed bands to deploy their own networks. Such new entrants may not rely on the traditional/licensed cellular operators, but they may need to adapt cellular technologies so they may deploy their networks using small cells in shared and dynamic spectrum such as TVWS. Such deployments typically may be standalone, without relying on any licensed carriers. There may be a number of motivations for such new entrants to deploy their own network. For example, traditional/licensed cellular operators may often act as gatekeepers, and they may tend to block new services such that the deployment of such a standalone network deployment, even in a non-ubiquitous fashion, would allow the new entrants to showcase or introduce these new services to end customers. Further, such new entrant players may not have a monthly billing relationship with end customers, and the basic connectivity provided by the small cell network may enable these new entrants to develop new business models (e.g., based on advertising). Also, such new entrant players often make devices that may not have cellular connectivity to address market segment for users that may not to pay a high monthly fee (e.g., tablets or e-readers). In addition, some new entrant players may have already made considerable investment in developing and lobbying TVWS technology.

As a result of a transition from analog to digital TV transmissions in the 470-862 MHz frequency band, portions of a spectrum may no longer be used for TV transmissions, although the amount and exact frequency of unused spectrum may vary from location to location. Such unused portions of spectrum are referred to as TV White Space (TVWS). The FCC has opened up such TVWS frequencies for a variety of unlicensed uses. The use of TVWS disclosed herein may include the opportunistic use of White Space in the 470-790 MHz bands. Such frequencies may be exploited by secondary users for any radio communication given that the secondary users may not be interfering with other incumbent/primary users. As a result, the use of LTE and other cellular technologies within the TVWS bands may be possible and may have been considered (e.g., in ETSI RRS). Use of LTE in other unlicensed bands, such as the ISM band, may also possible.

Figure 5:
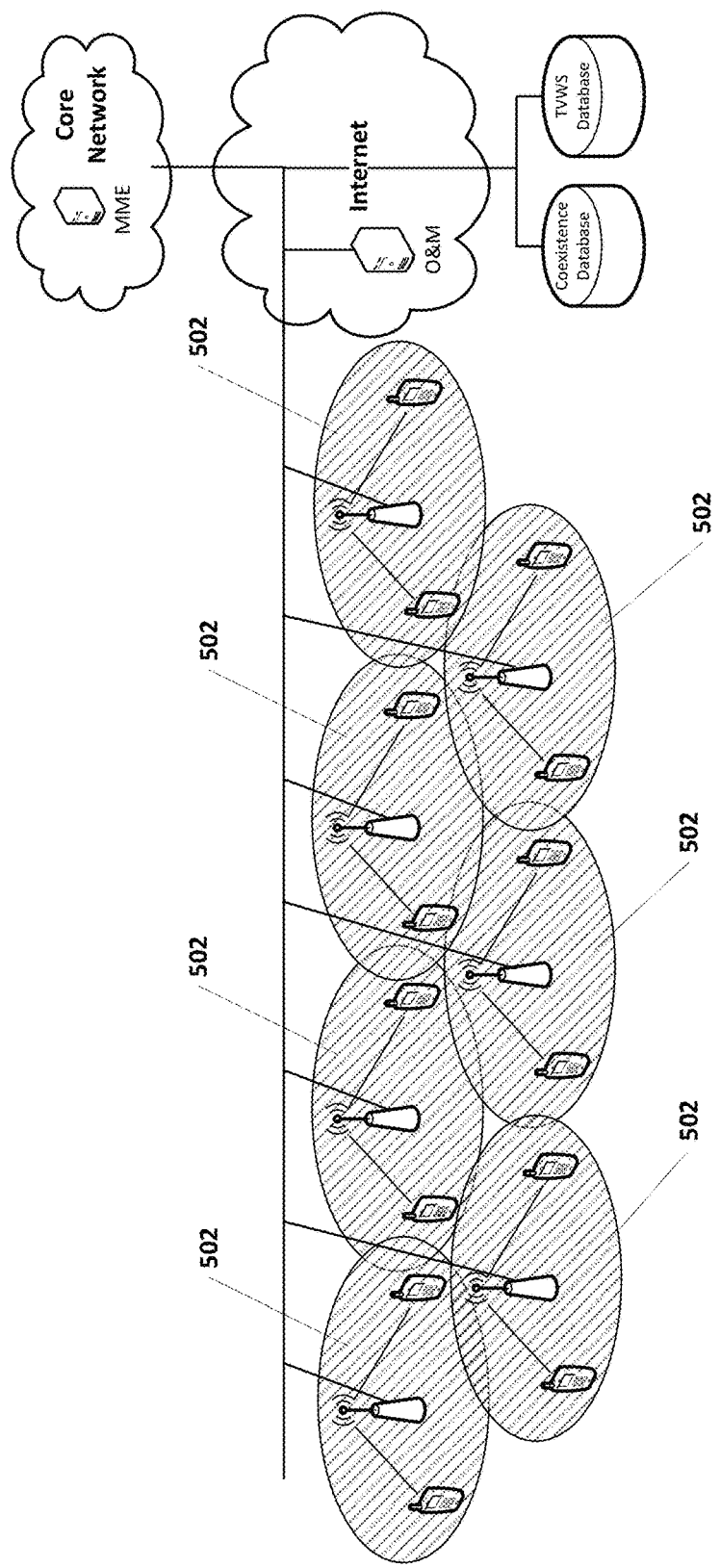
FIG. 5 depicts an example of cells operating in a dynamic and/or shared spectrum.

Various options are available for using a dynamic and shared spectrum in a communication system such as a LTE system (e.g., using LTE in a dynamic and shared spectrum). In one example (e.g., option 1), a network, such as a LTE network, may operate using small cells 502 (such as TVWS Pico cells) that may be restricted to a dynamic and shared spectrum alone as shown in FIG. 5. Such an example may be adopted or used by new entrants that may not have access to a licensed spectrum. Base stations operating in dynamic and shared spectrum may typically be limited in terms transmitted output power such that cells may likely be of small footprint, for example, a few hundreds of meters in radius. Each base stations may also be linked to a TVWS database at a minimum (e.g., optionally via an O&M entity) and possibly also with a coexistence database.

Figure 6:
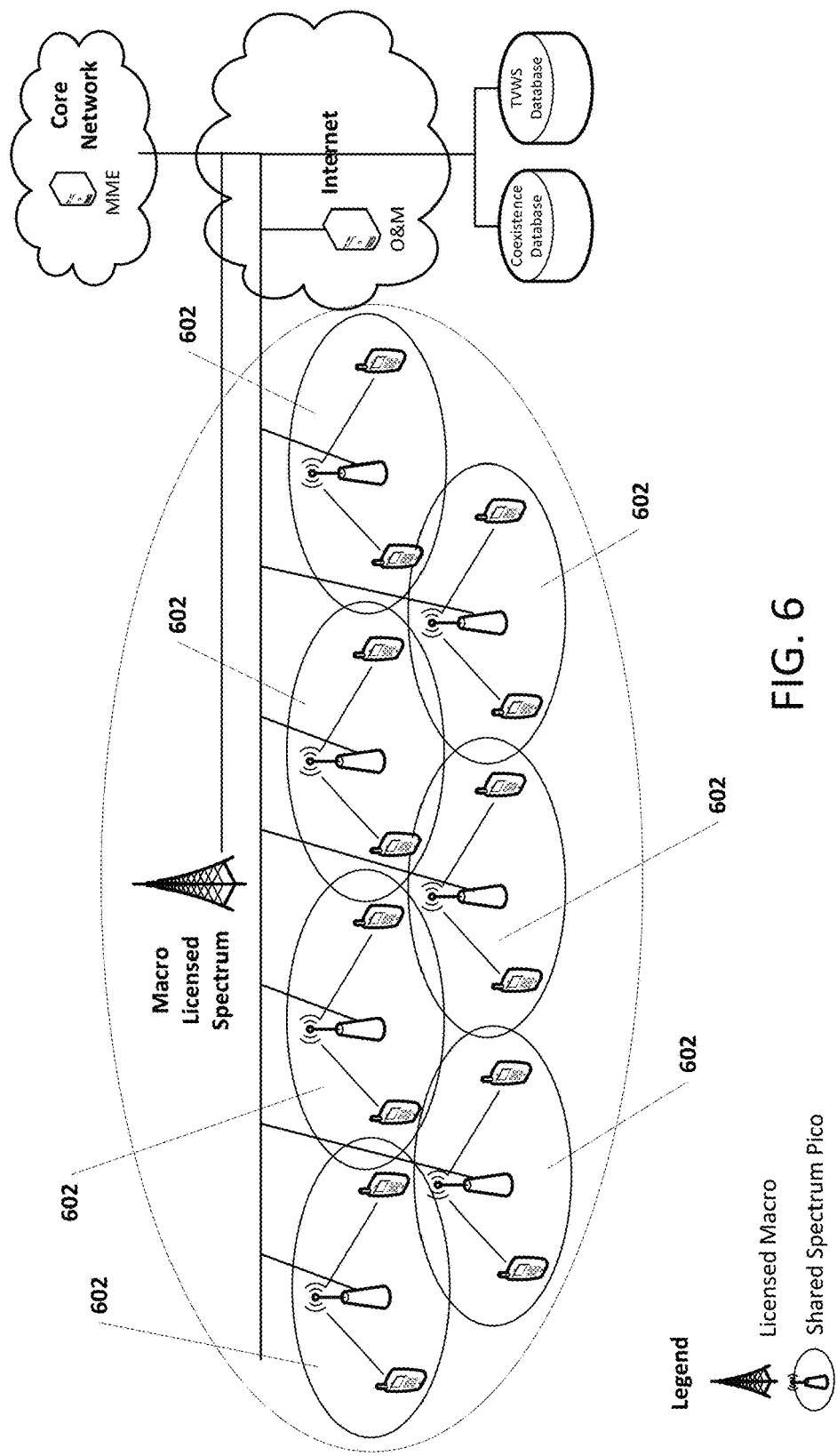
FIG. 6 depicts an example of cells operating in a dynamic and/or shared spectrum with a licensed macro overlay.

In an example (e.g., a second option) shown in FIG. 6, a network such as a LTE network may be deployed using small cells 602 operating in dynamic and shared spectrum where an overlay of macro cells using licensed spectrum may also present. Such an example may be viable for an existing operator that may like or wish to add capacity to network associated therewith, offer tiered services, and/or offload capacity to the small cells 602. Base stations of such networks (e.g., the overlay macro cell and the small cells operating in dynamic and shared spectrum) may have access to the TVWS database at a minimum (optionally via an O&M entity) and possibly also with a coexistence database.

Figure 7:
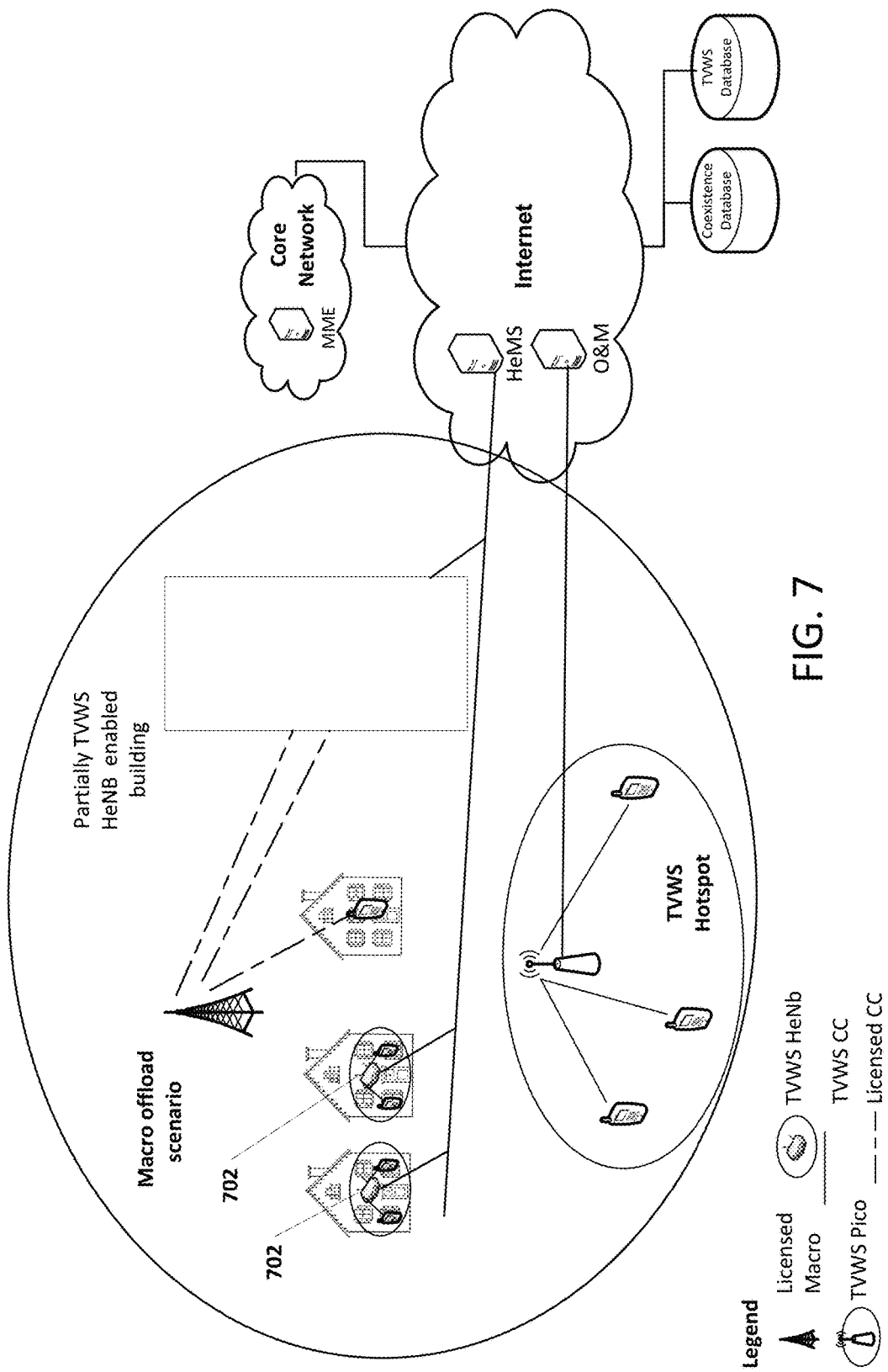
FIG. 7 depicts an example of non-contiguous cells operating in a dynamic and/or shared spectrum with a licensed macro overlay.

An example (e.g., of option 2) with a more sparse deployment of small cells 702 (e.g., a non-contiguous deployment) may be shown in FIG. 7.

A number of problems may be addressed for base stations operating entirely in a dynamic and shared spectrum. For example, problems associated with the random access procedure for WTRUs camping on such cells in IDLE mode may be addressed as disclosed herein. The spectrum may be shared by competing secondary users. Such secondary users may use a radio access technology that may be different from LTE. Although some of these radio access technologies may have a built-in coexistence mechanism (e.g., 802.11 systems may rely on carrier sensing multiple access (CSMA)), such a co-existence mechanism may not be guaranteed. As a consequence, a communication system, such as the LTE system, operating in a dynamic and shared spectrum may be able to deal with both controllable and uncontrollable secondary user interference. Controllable interference may imply that a secondary user may defer its transmission and allow or enable, for example, LTE to operate free of such secondary user interference. Uncontrollable interference may imply that a secondary user may take no special action to coexist with, for example, LTE, and the communication system such as the LTE system may operate in spite of such secondary user interference. Uncontrollable interference may be a result of a radio access technology, or it may be also a result of a layout of a network (e.g., caused by hidden nodes).

Figure 8:
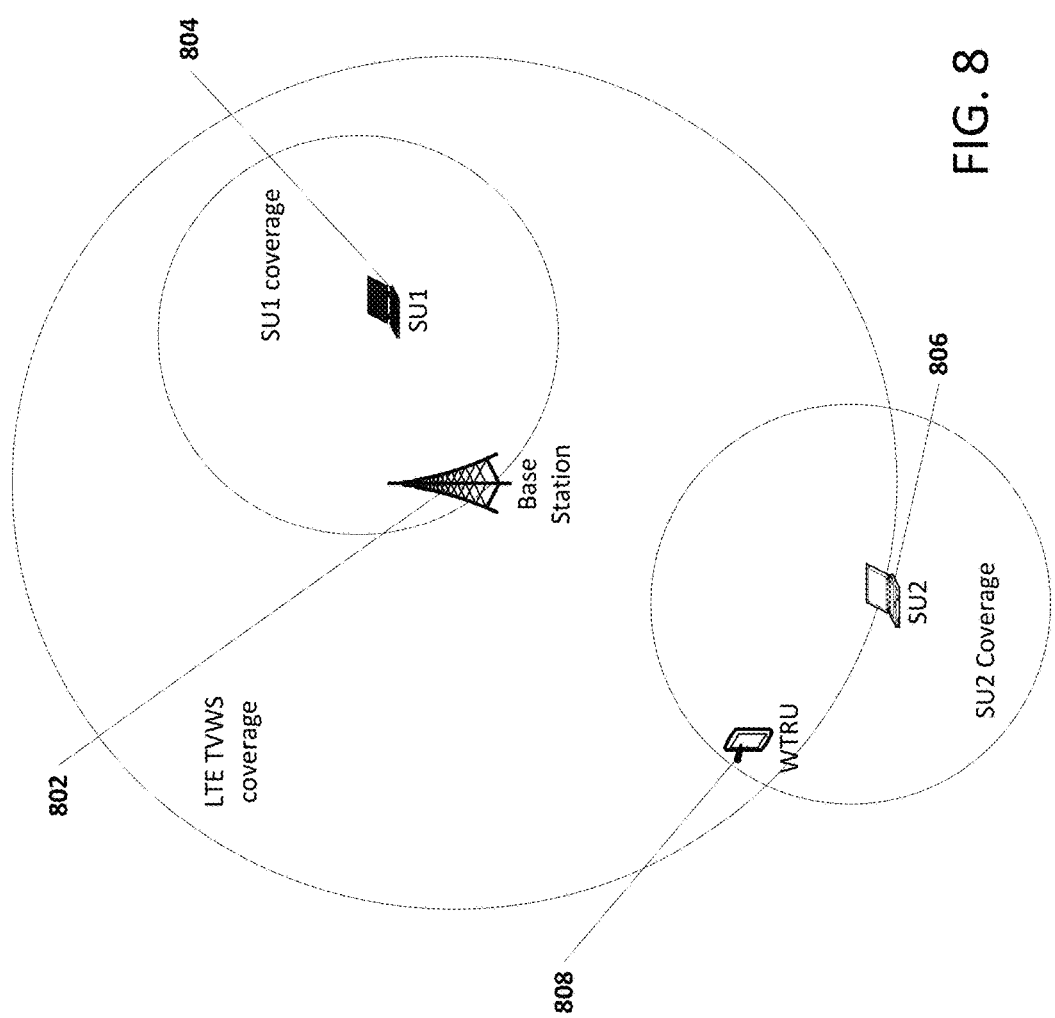
FIG. 8 depicts an example controllable and/or uncontrollable secondary user interference.

The secondary users may cause UL transmission failures as well as downlink transmission failures, for example, as shown in FIG. 8. For example, a secondary user 804 near a base station 802 (e.g., a secondary user SU1) may be controllable for DL transmissions from the base station 802, but such a secondary user 804 may still result in UL transmission failures because the interferer may not be controllable by LTE uplink transmissions from a WTRU 808 that may be hidden from the secondary user 804. Uplink transmissions may be very difficult to receive at the base station. Similarly, a secondary user 806 near the WTRU 808 (e.g., a secondary user SU2) may be controllable by uplink transmissions from the WTRU 808, but such a secondary user 806 may still result in DL transmission failures. DL transmissions for the WTRU 808 may be difficult to receive as the base station 802 may be hidden from the secondary user 806 as shown in FIG. 8.

In one example, the secondary user may be a WiFi interferer. However, it should or may be understood that such an example of a potential secondary user interference that results in controllable interference may be extended to other radio access technologies.

Random access methods or procedures such as RACH methods or procedures may need to operate on shared spectrum with secondary users and the equipment used thereby (e.g., secondary WTRUs).

Figure 9:
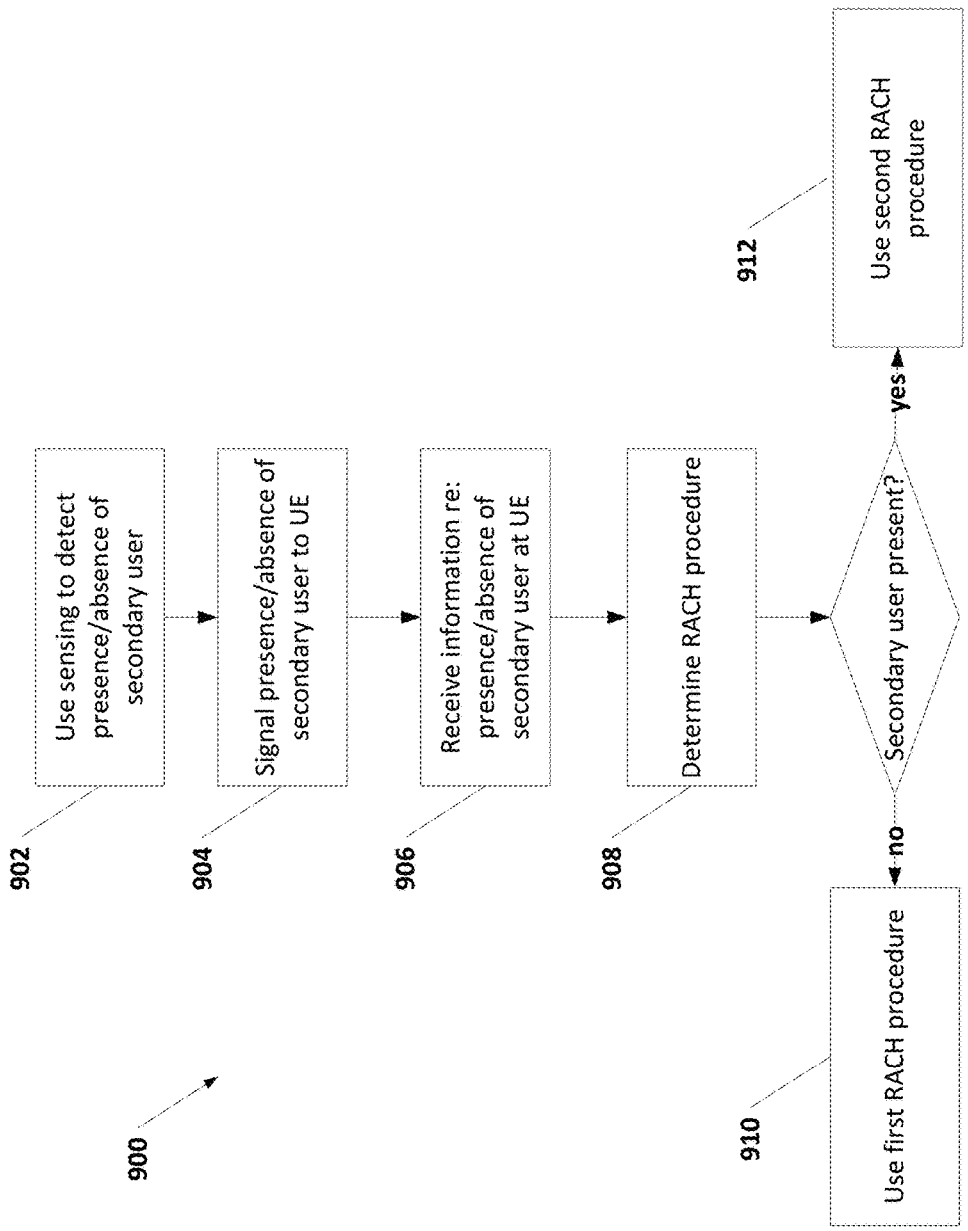
FIG. 9 is a process flow diagram depicting an example method for detecting a presence of a specific secondary user in an operating channel.

An eNB may support feature detection that may enable the eNB to detect the presence of a specific secondary user (e.g., WiFi) in an operating channel. FIG. 9 illustrates an example method 900 for detecting the presence of a specific secondary user in an operating channel. At 902, the eNB may use sensing, e.g., feature detection to detect whether a specific secondary user is present in an operating channel. At 904, the eNB may signal such information to WTRUs, for example, through the use of SIB information or through dedicated signaling such as a RRC configuration message. A WTRU may receive this information from the eNB at 906. At 908, the WTRU may be configured based on this information to modify the RACH procedure 300 of FIG. 3. For example, this may trigger the WTRU to listen to a communication channel (e.g., a medium) to verify if the medium may be free prior to sending the preambles as described herein. Furthermore, the eNB may assist the WTRU by silencing a portion of the downlink subframe, for example, by using an almost blank frame in the downlink prior to an uplink opportunity for the RACH in the context of a communication system such as a TDD LTE system or by the absence of uplink scheduling in the uplink subframe prior to the RACH opportunity. The WTRU may be signaled during such a silencing period by the eNB such that the WTRU may do energy detection to detect if other secondary users may, in fact, be using the medium or not prior to sensing the RACH preamble. Accordingly, if a secondary user may be absent in the operating channel, the WTRU may use a first RACH procedure at a 910. If a secondary user may be present in the operating channel, the WTRU may use a second RACH procedure at 912.

A WTRU being configured to operate in the presence of a secondary user may modify the RACH power ramp-up procedure. For example, the WTRU may send its first preamble at a higher power by a delta from the default power level to be used if an eNB signals the presence of a secondary user. Subsequent RACH preamble transmissions may also use the same delta from the default power level. The type of secondary user signaled by the eNB, for example, WiFi being present instead of WiMax, may trigger the WTRU to select one of the techniques described herein.

A RACH procedure or method such as that disclosed herein may be enhanced by having a WTRU avoid secondary user interference when transmitting the RACH. The WTRU may perform sensing of a medium with possibly feature detection to detect the presence of other RATs (e.g., WiFi) to determine if the medium may be available prior to preamble transmission. If the medium may be found to be free, the WTRU may transmit the RACH preamble. Otherwise, the WTRU may wait until the medium may be free and the eNB may be expecting a RACH preamble to transmit it. As such, the WTRU may avoid transmitting the RACH preamble at the time when a secondary system may also be using the medium and performing unnecessary power ramping that may eventually interfere with the same communication system such as the same LTE system or other communication systems such as other LTE systems operating in the vicinity.

Figure 10:
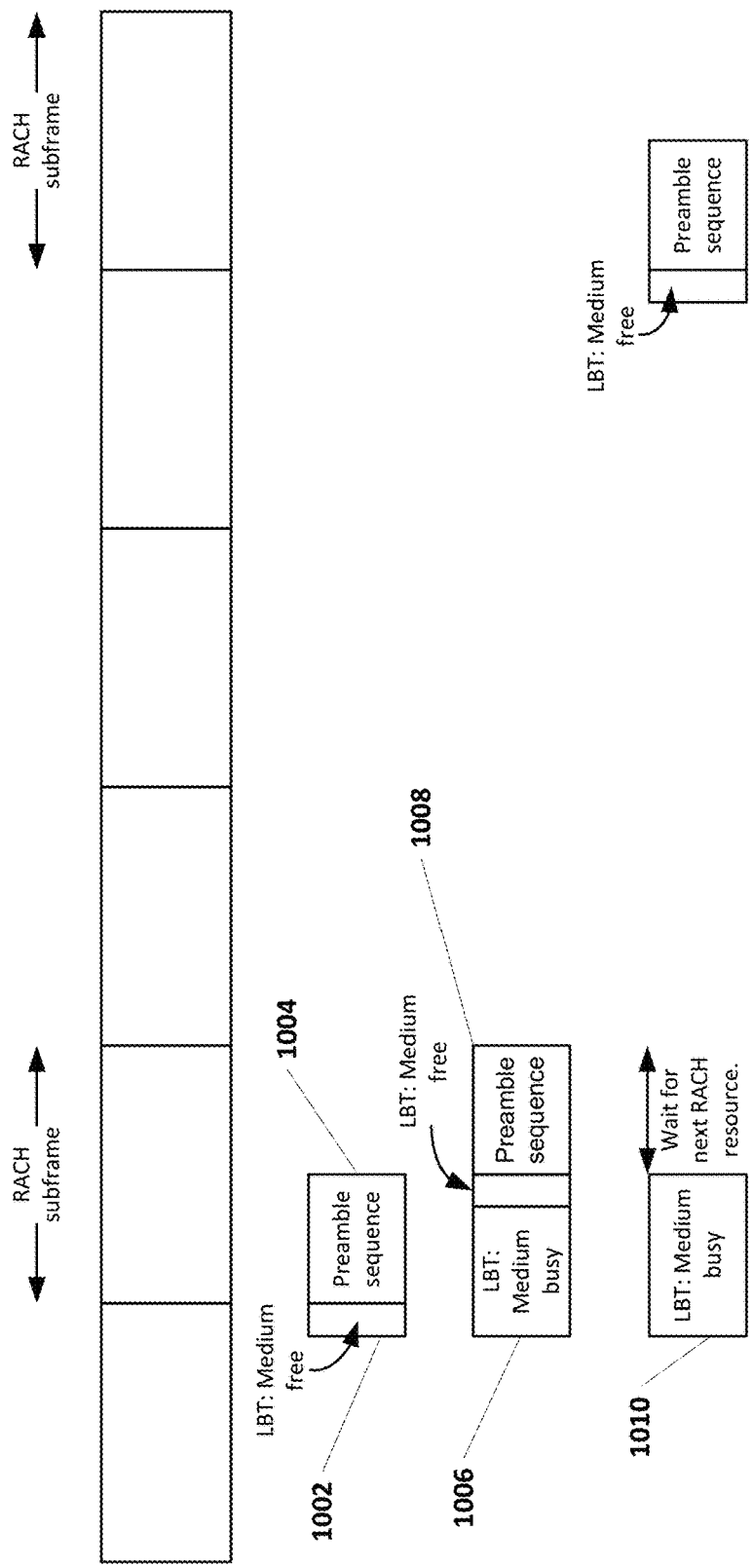
FIG. 10 depicts an example of a random access channel (RACH) preamble transmission using Listen Before Talk (LBT).

FIG. 10 illustrates a transmission of the RACH using a preliminary sensing or "listen before talk" phase used by a WTRU. For example, an eNB provides RACH preamble resources during uplink subframes. When the MAC layer at the WTRU triggers a RACH, the WTRU may wait for a RACH preamble resource that may be known to the WTRU via system information. Prior to the start of such a resource, the WTRU may perform a short sensing of the medium to determine whether the medium may be currently used by another secondary user. If the medium may be free, as shown at 1002, the WTRU may transmit a preamble 1004 during the RACH resource. If the medium may be busy, the WTRU may perform a retry according to one or more of a number of rules. If the medium may be busy initially and becomes free at any time during the resource, as shown at 1006, the WTRU may transmit a preamble 1008 as long as the transmission may fit into the current RACH resource. If a medium may be busy during entire preamble such that if the medium continues to be busy beyond the point where the RACH preamble may be transmitted within the current resource, as shown at 1010, the WTRU may wait until the next available RACH resource and repeat (e.g., transmitting the preamble) without increasing the power of the preamble. In the event of an unsuccessful RACH such that if a WTRU succeeds in transmitting the RACH preamble during a RACH resource and the RACH may not be successful (e.g., no RACH response may be received from the eNB, or the RACH procedure may fail during the contention resolution step), the WTRU may repeat (e.g., transmitting the preamble) after ramping up the transmit power for the RACH preamble.

If multiple consecutive RACH subframes may be available to send the preambles, the WTRU may sense the medium. If the medium becomes free during subframe_x and subframe_x+1 may also be available for RACH preamble, the WTRU may send a RACH preamble that could terminate in subframe x+1. In other words, the beginning of the RACH preamble may be in subframe x and the end may be in subframe x+1. One rule could be to use the subframe number when constructing the RACH preamble, from which the preamble start time belongs. Another rule could be based on the subframe number from which the preamble start time may be closest to the start of the subframe.

If multiple consecutive RACH subframes may be available to send the preambles, if the medium may be busy during an entire RACH subframe, the WTRU may apply power ramp-up rules and may increase the power when it may send the preamble if the medium may become free in the subsequent subframe.

A WTRU may perform a sensing procedure to determine whether a medium may be free or not. The WTRU may modify the power ramp-up rules of the RACH preambles such that the preambles may be sent at a higher power by a delta from a default power level to be used if the medium may not free. If the medium may be free, the WTRU may follow the default power level. The delta may be signaled by the eNB.

The sensing that may be done prior to sending a RACH preamble may involve a simple energy detection or may involve a feature detection, depending on the type of secondary users expected to coexist with a communication system, such as the LTE system, and the capabilities of the WTRU. For instance, if a LTE system may coexist with other LTE systems as well as WiFi systems, the LTE system may abstain from transmitting the RACH preamble when the channel may be occupied by a WiFi system. Feature detection may be able to detect that a medium may be busy due to WiFi transmission and not due to LTE transmission. The eNB may assist the WTRU in determining whether or not other secondary user RATs may be present in the channel. For example, SIBs information may indicate that a given RAT may be present in the cell, for example, triggering the WTRU to enable feature detection for the specific RAT.

Figure 11:
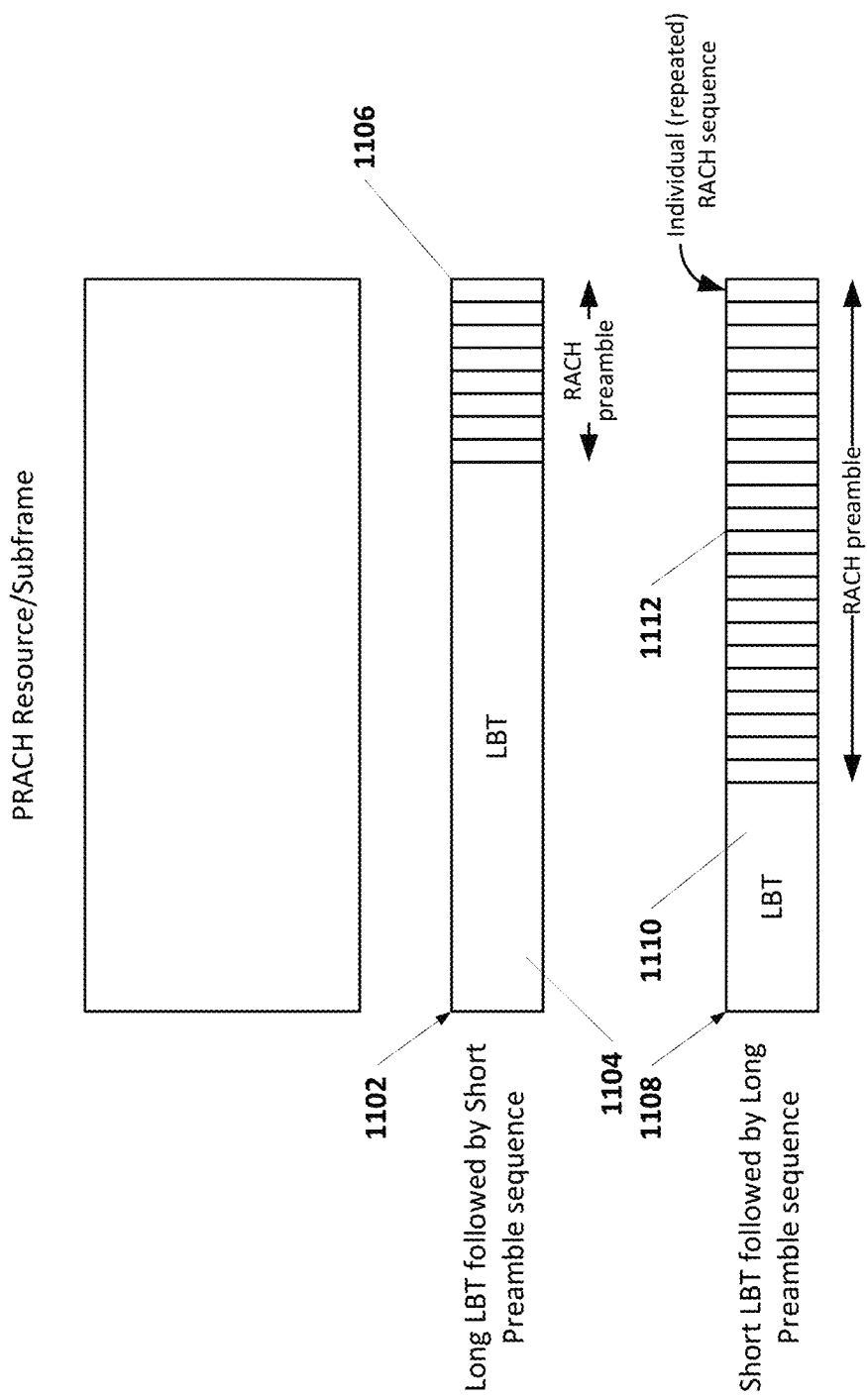
FIG. 11 depicts an example of a variable length RACH preamble using sequence repetition.

For a small cell, the length of the RACH preamble sequence may also be reduced to increase the length of time in which the Listen Before Talk (LBT) may be performed. The preamble sequence may be long enough to ensure unambiguous round-trip estimation time for a WTRU at the edge of the largest cell. Since such cells may be limited to 300 m, the approximate minimum preamble sequence length may be $300/(3 \times 10^8)=1$ μs. Such a minimum may be much shorter than the value of 800 μs for the preamble sequence in LTE that may be used. The resulting short preamble sequence may then be transmitted once following the LBT time of each WTRU, or multiple times until the end of the preamble resource to allow for non-coherent combining of the copies of such a sequence at the eNB. Such repetition may be done a number of times depending on the remaining time in the RACH subframe at which the WTRU may determine that the channel may be free of WiFi interference (e.g., a sufficient number of repetitions to occupy the remainder of the RACH subframe following a successful LBT). FIG. 11 illustrates an example of a variable length RACH preamble using sequence repetition. In particular, FIG. 11 depicts a first RACH subframe 1102 having a long LBT 1104 followed by a short preamble sequence repetition 1106. FIG. 11 also depicts a second RACH subframe 1108 having a short LBT 1110 followed by a long preamble sequence repetition 1112.

Figure 12:
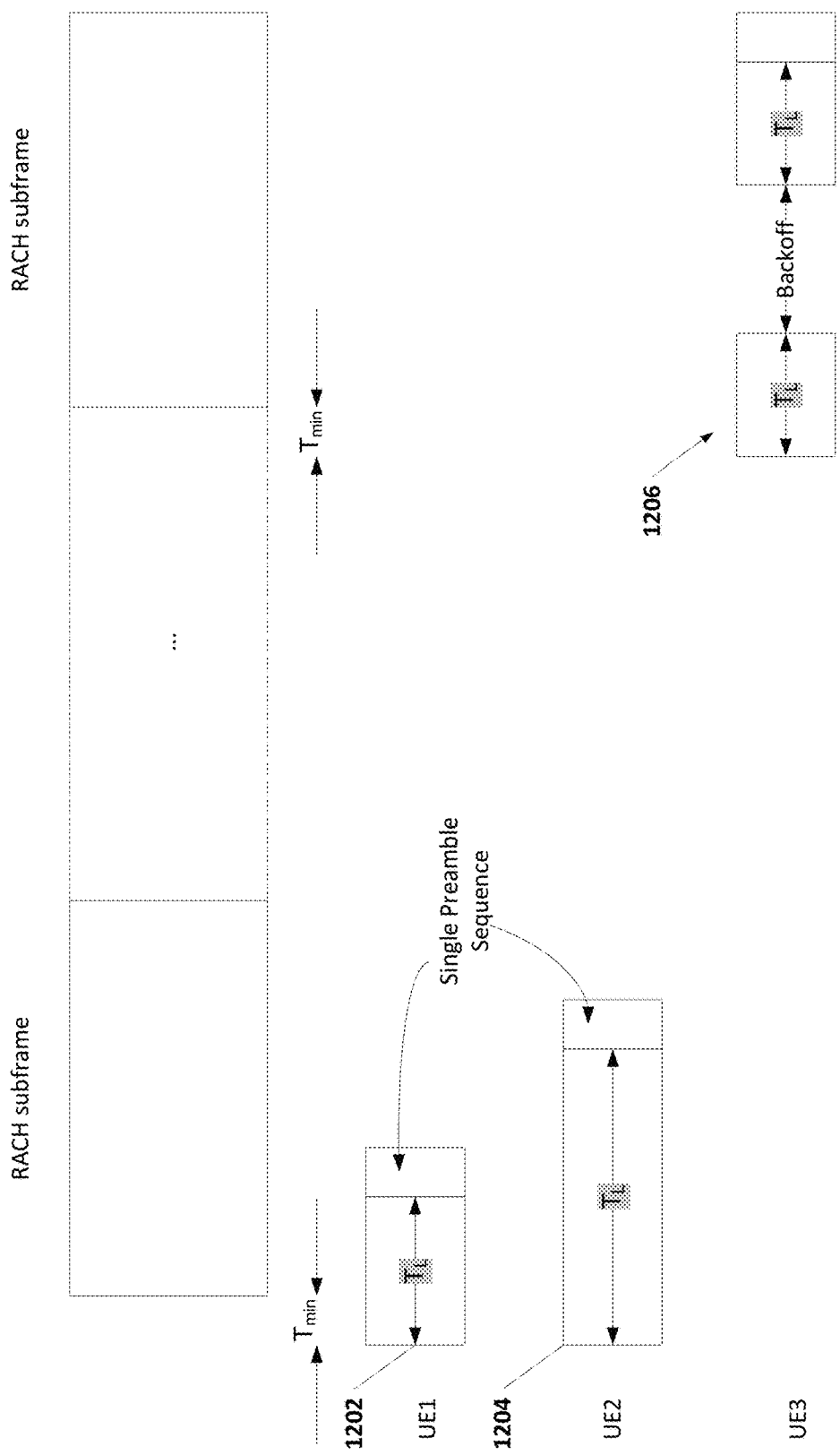
FIG. 12 depicts an example of one or more rules for random LBT duration and backoff.

A short RACH preamble sequence may be transmitted a single time, but at a random time instant by a WTRU to provide a lower probability of RACH collisions between multiple WTRUs using the same RACH resource. As such, a technique may be used in the context of TDD operation over a small bandwidth (e.g., typical of TVWS) where an eNB may not allocate as many RACH resources as in the case of larger bandwidths. This could also apply to the case of DL heavy configurations with few uplink subframes, or in the presence of coexistence gaps that may limit the number of UL subframes in which RACH resources may be allocated by the eNB. To enable the random transmission of the RACH preamble, the time spent on an initial LBT that may be performed just prior to the RACH resource may be randomized on a per WTRU basis. A WTRU, when performing LBT, may initially spend a random amount of time on the LBT prior to transmission of the RACH preamble. The WTRU may therefore follow one or more of a number of rules. FIG. 12 illustrates the use of such rules (e.g., for random LBT duration and backoff) using multiple WTRUs. As shown at 1202 and 1204, the WTRU may select a random time $T_L$ for which to perform LBT where $T_L$ ranges from $T_{min}$ to $T_{max}$ and where $T_{min}$ corresponds to the amount of time prior to the subframe boundary (at the WTRU) in which to start the LBT, and $T_{max}$ may be specified by the eNB through system information. Two different values of $T_L$ for two different WTRUs are shown at 1202 and 1204. The WTRU may perform LBT for $T_L$ starting $T_{min}$ prior to the subframe boundary and transmit the preamble immediately after $T_L$ when the medium may be found to be free for the entire time $T_L$. If the medium may be found to be occupied, the WTRU may backoff for a specified amount of time, as shown at 1206, and repeat (e.g., performing Listen Before Talk (LBT)) where such a backoff time may also be variable in length.

As multiple WTRUs may send the short preamble in a single subframe, the current definition of RA-RNTI (e.g., the Release 10 definition of RA-RNTI) may no longer be used at, for example, 304 of the RACH procedure 300 of FIG. 3 (e.g., to identify the WTRU that may receive the grant for the L2/L3 message). For example, in a communication system, such as a LTE system, a given preambleID sent in RACH resource y (y=0, 1, 2, . . . , 6) in subframe x (x=0, 1, 2, . . . , 9) may be acknowledged by the eNB with a grant to address RA-RNTI=1+x+10y. In the example shown in FIG. 12, both preambles sent by UE1 and UE2 and shown at 1202 and 1204, respectively, may have the same RA-RNTI. To eliminate such confusion, the RA-RNTI may provide an indication of the time at which the small preamble may be sent. This indication may be based on the concept of RACH slots. A RACH subframe may be divided into a number of RACH slots. The number of slots ($N_{slot}$) may be equal to the subframe size divided by the preamble, and potentially cyclic prefix, size. For example, if a RACH preamble+cyclic prefix may be 0.1 millisecond in duration, then a 1 millisecond subframe may have 10 RACH slots. The communication system, such as the LTE system, may use a larger preamble set and may reserve distinct preambles for each of these RACH slots. The WTRU may send consecutive RACH preambles and code the RACH slot or some other identifier (e.g., z) in the combination of preambles. The first preamble may still be selected randomly (preambleID1), but the second preamble (preambleID2) may be found by some combination of preambleID1 and z. For example, one such combination may be preambleID2=preambleID1+z. In some cases, the preambleID2 may be given by (preambleID1+z) mod (the number of preamble IDs). Upon recovering the set of preambles, the eNB may know the z from the preambleID combination and then may respond with a grant to RA-RNTI=1+x+10y+60z.

A timing advance may be performed based on an assumption that each WTRU may transmit the RACH preamble at the beginning of the RACH subframe. Since this may no longer be the case when a RACH preamble may be transmitted using LBT (e.g., as specified above), a procedure may be used for applying timing advance in the WTRU. In particular, the WTRU may remember the time at which it began transmission of the RACH preamble. The eNB may, in the random access response, indicate the timing advance value based on the assumption that the RACH preamble may be transmitted at the beginning of the subframe. The WTRU may correct this timing advance command using the knowledge of when it transmitted the preamble. For example, the correction amount may be the delay between the subframe boundary and the preamble transmission both seen by the WTRU. Subsequently, the WTRU may inform the eNB of the correction factor on the timing advance during or after the RRC connection request.

Secondary user interference techniques may rely on the fact that the secondary user transmissions may defer access to other transmissions if such secondary users may sense the communication resource (carrier/channel) busy. This may be inherent in 802.11-based WiFi systems.

Solutions may be divided into classes. The solutions described may be combined. In a first class, a communication system, such as the LTE system, may rely on connected mode WTRUs to guarantee, or almost guarantee, that secondary users may be silent when a random access transmission occurs. In a second class, a communication system, such as the LTE system, may alter the manner in which random access transmissions may be sent to increase the probability that secondary users may be silent for at least part of the random access transmission.

Figure 13:
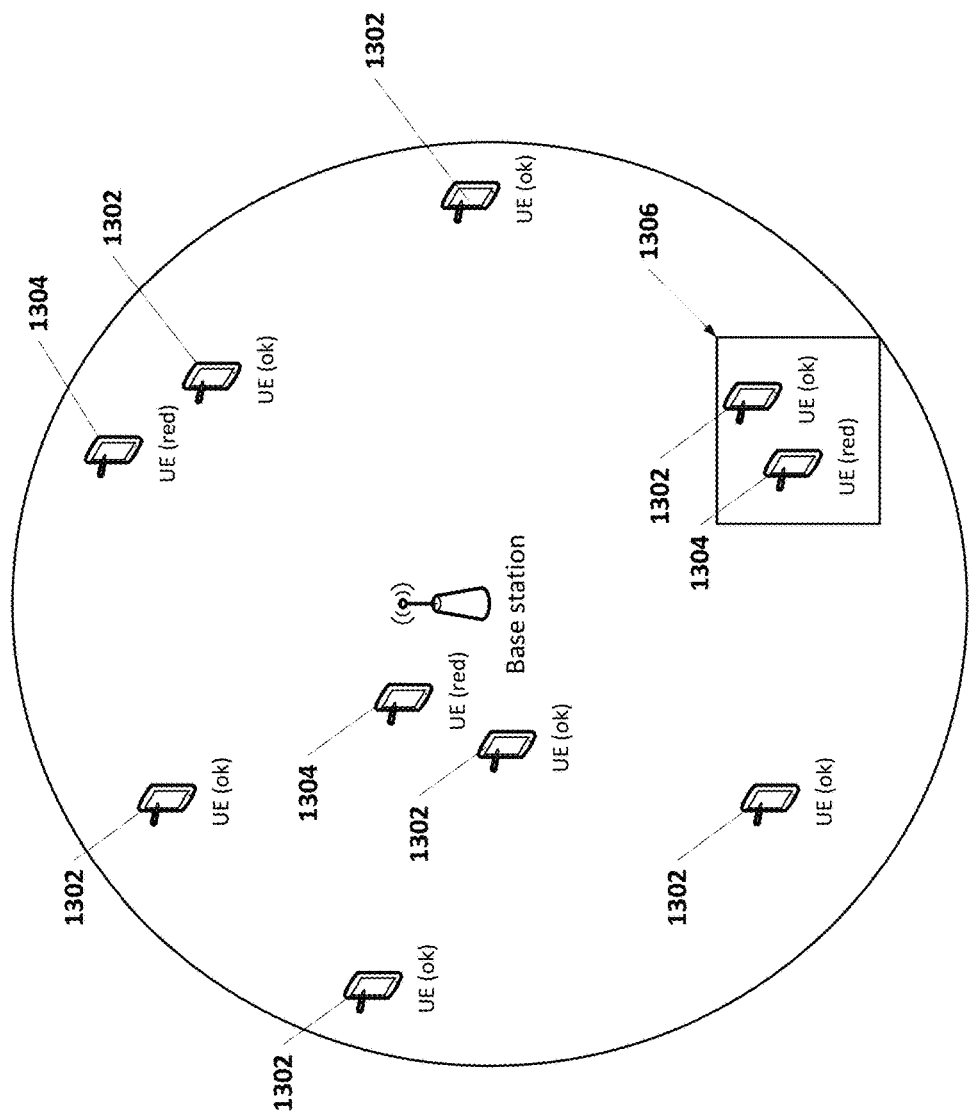
FIG. 13 depicts an example of scheduling uplink (UL) transmissions based on a location.

A random access procedure or method described herein below may also be used or provided. For example, a base station may schedule UL transmissions on a PUSCH based on coverage area such that UL transmissions from WTRUs that may be spread across the coverage area. The base station may rely on WTRU location information (e.g., through GPS reporting or through some network based location information) to schedule WTRUs such that areas of the base station coverage area may have at least one WTRU with a scheduled uplink transmission. FIG. 13 shows an example where the base station scheduling algorithm may take into account the WTRU location by trying to schedule the WTRUs labeled UE(ok) and depicted at 1302. The WTRUs labeled UE(red) and depicted at 1304 may be redundant from a coverage perspective. The scheduler may schedule these but with a lower priority. For fairness, in subsequent subframes, the scheduler may alternate which WTRUs to schedule. For example, the WTRUs shown in the box depicted at 1306 may change roles in subsequent subframes (e.g., a UE(ok) becoming a UE(red) and vice versa).

Ongoing WiFi transmissions may see such a WTRU UL transmission as interference. Such WiFi transmissions may not be acknowledged and may use a retransmission. Such a retransmission may be blocked by the WTRU uplink transmissions. Additionally, other WiFi stations may be waiting for the medium to become free and may continue to defer their transmissions to the WTRU uplink transmissions (see, e.g., FIG. 14).

Figure 14:
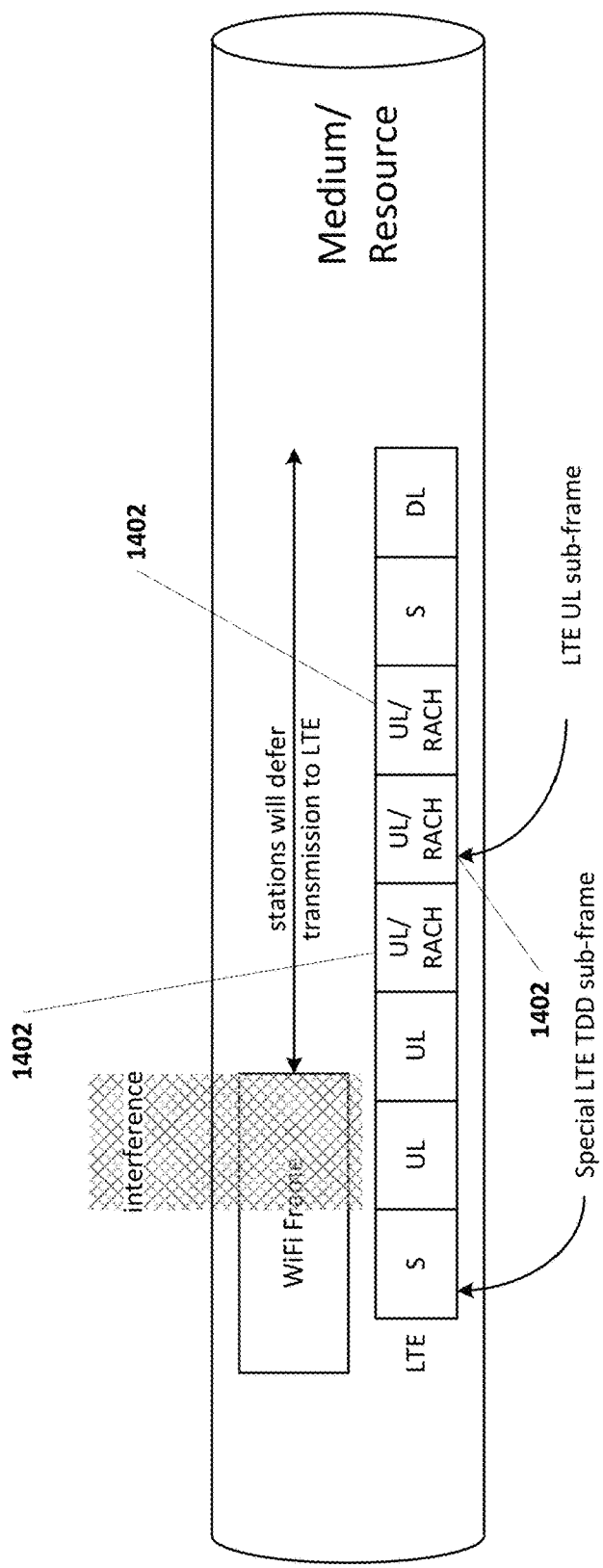
FIG. 14 depicts an example of UL transmissions that may cause secondary users to defer.

A base station may schedule a RACH in subframes where the LTE system may be likely to have no secondary user interference. In FIG. 14, this may occur in subframes 1402 labeled UL/RACH. The location of these UL/RACH subframes 1402 may depend on the type of secondary user interference that the LTE system may be trying to control. For example, this may depend on the largest WiFi frame size.

A random access procedure or method described herein below may also be used or provided. For example, the base station may rely on the UpPTS to cancel any ongoing WiFi transmissions. The role of the UpPTS may be altered to send a form of strong jamming signal to the WiFi transmissions. Frame transmissions that may overlap the UpPTS may likely fail and result in a retransmission after the appropriate delay for reception of the WiFi ACK, the interframe spacing, and the random contention window. During such an interval, the LTE system may schedule a random access transmission in an UL subframe. The UL subframe to choose may be based on the type of secondary user interference that the LTE system may be trying to control. For example, this may depend on the largest WiFi frame size. The transmitted UpPTS signal may be pre-configured in the WTRU, or obtained through system information. Each WTRU may send such a signal during the UpPTS portion of a special or particular subframe.

Figure 15:
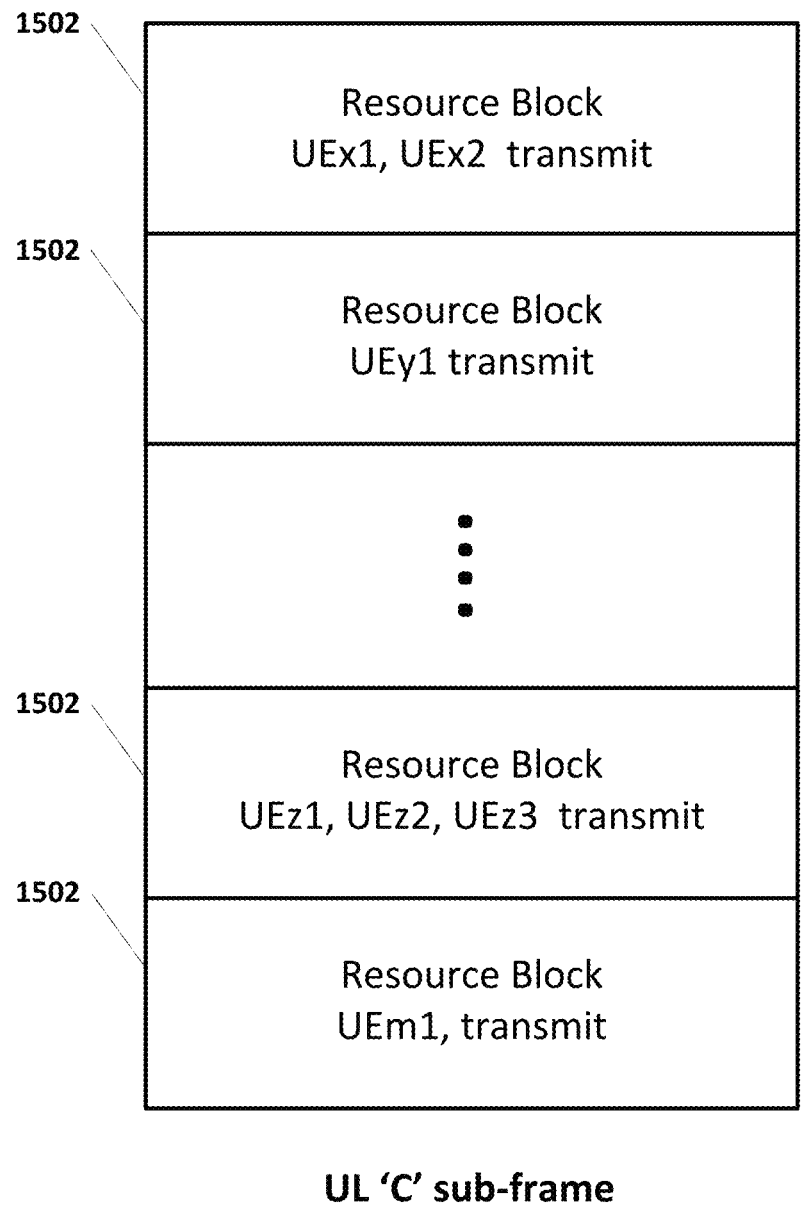
FIG. 15 depicts an example of wireless transmit/receive unit (WTRU) transmissions during a C subframe.

A random access procedure or method described herein below may also be used or provided. For example, the LTE system may rely on a type of special subframe to cancel ongoing WiFi transmissions. Such a special subframe (hereinafter referred to as a Clear (C) subframe) may be transmitted by connected mode WTRUs. FIG. 15 illustrates an example of WTRU transmissions during a C subframe. During such a subframe, the WTRU may randomly choose one or more resource blocks 1502 and may transmit a special packet. Resource blocks 1502 may be available for the special packet. A subset of the resource blocks 1502 may be available for the special packet. As connected mode WTRUs may be transmitting on the uplink, this may cause any frame transmissions that may overlap the C subframe to likely fail, resulting in a retransmission after the appropriate delay (e.g., delay due to reception of the WiFi ACK, the interframe spacing, and the random contention window). During such an interval, the LTE system may set aside UL subframes to carry random access transmissions.

Figure 16:
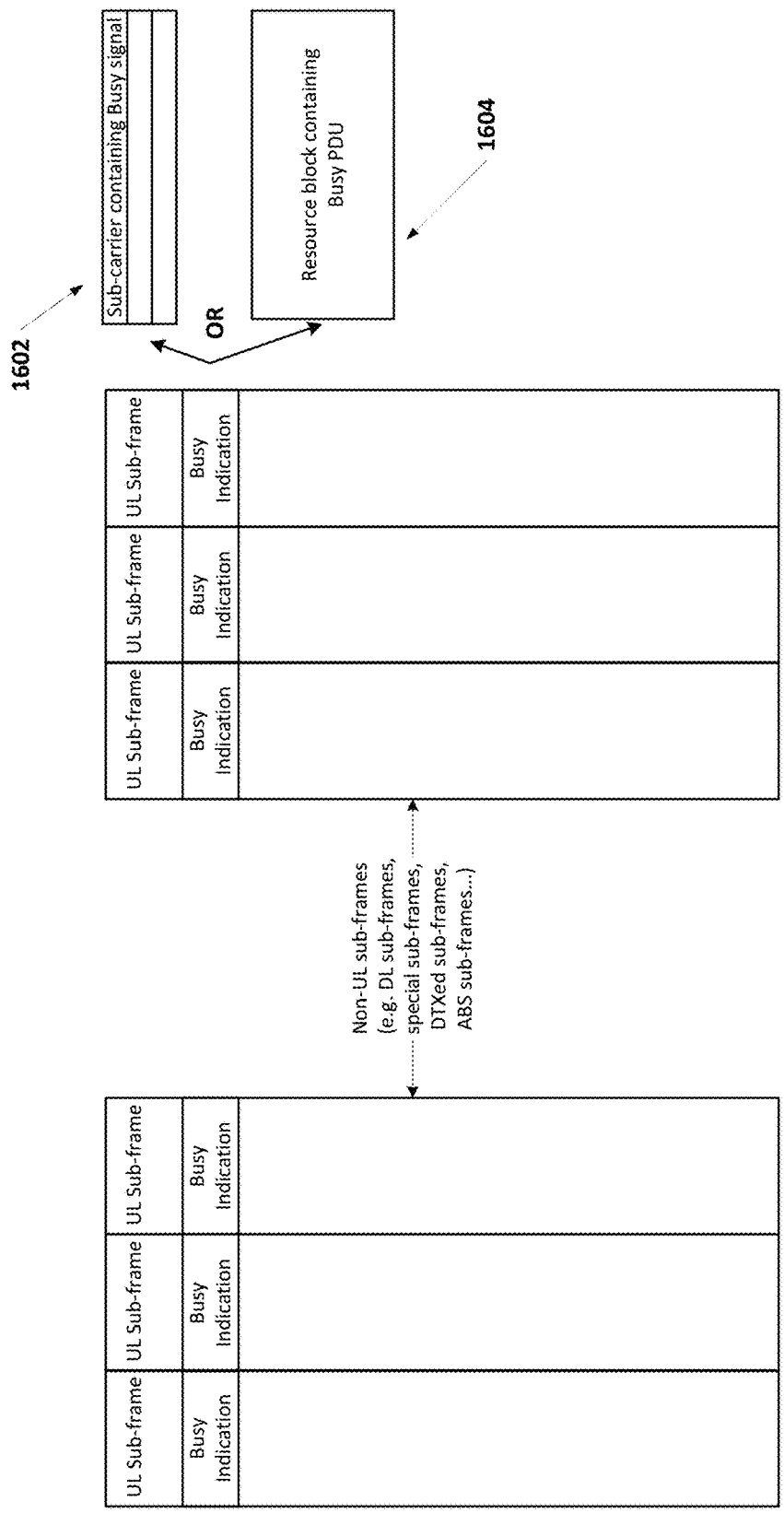
FIG. 16 depicts an example of a busy indication that may be carried by WTRUs.

A random access procedure or method described herein below may also be used or provided. For example, the LTE system may reserve a portion of the resource to carry a busy indication. As illustrated in FIG. 16, the reserved resource may be a set 1602 of subcarriers that may carry a busy signal, or a set 1604 of resource blocks that carry a busy PDU. Connected mode WTRUs may transmit such a busy indication according to a specific frequency (e.g., once every K uplink subframes). The value of K as well as the transmit power for the indication may be preconfigured or provided through RRC signaling (e.g., through system information). The location of the busy indication may be close to the extremities of the band to be closer to the PUCCH and avoid non-contiguous uplink transmissions.

Figure 17:
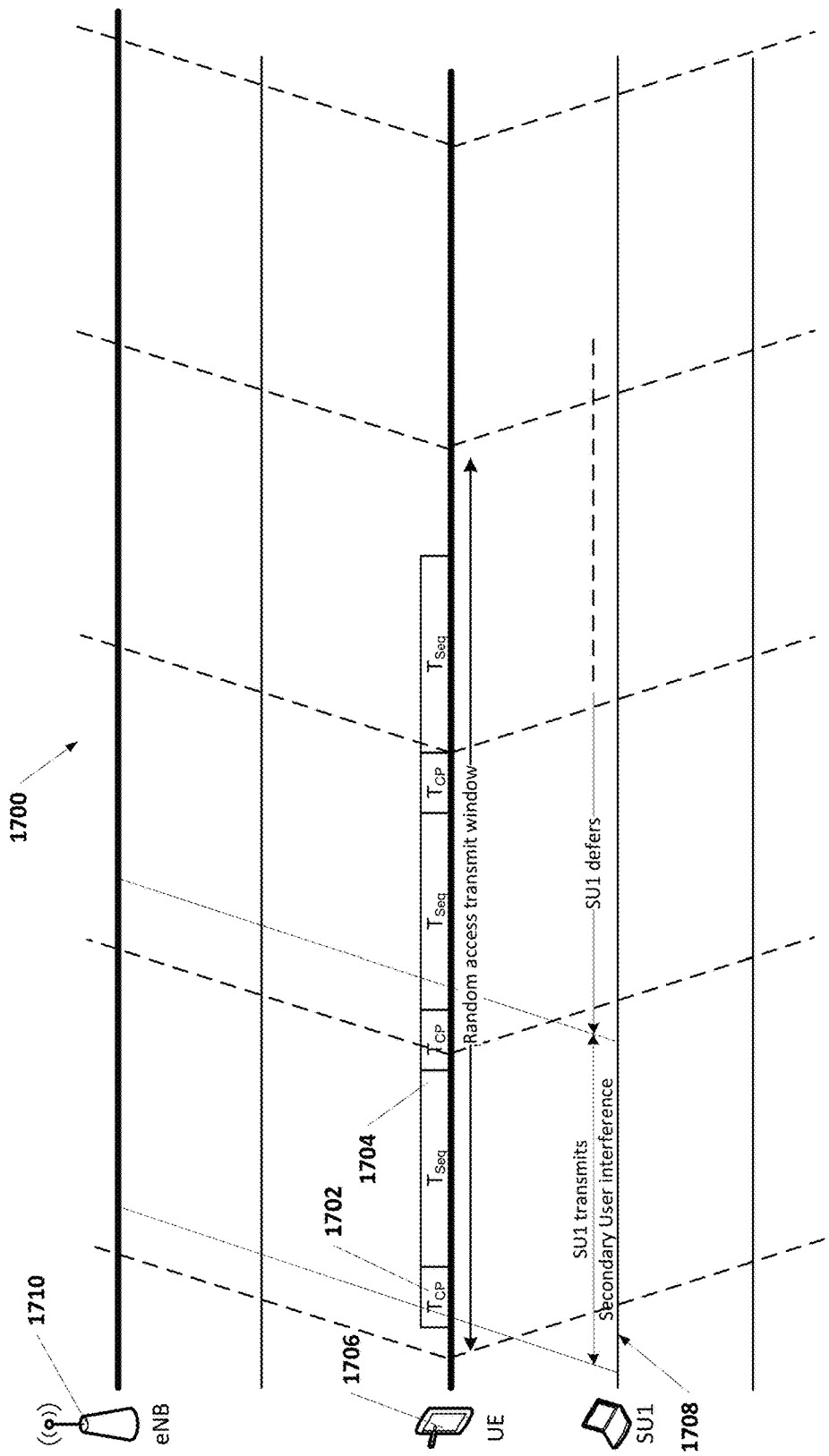
FIG. 17 depicts an example of continuous repeated random access transmissions.

A random access procedure or method described herein below may also be used or provided. For example, a random access transmission may be extended to provide enough time for a secondary user to allow transmitting stations to complete their frame transmission (e.g., if any), sense the medium as busy, and/or defer, and/or may allow already deferring stations to continue to sense the medium as busy and defer. The random access transmission may be extended by using a long preamble format, e.g., either an existing format or a new format). For example, FIG. 17 shows an example format 1700 spread over a random access transmit window of 3 milliseconds where a short cyclic prefix 1702 (size $T_{CP}$) may be followed by a preamble 1704 of size $T_{seq}$ that may be repeated multiple times, e.g., three times. Optionally, the cyclic prefix 1702 may be repeated between each repetition. A WTRU 1706 may transmit the same preamble in each repetition and at the same power. The WTRU 1706 may ramp up the power for each retransmission. The example in FIG. 17 shows a secondary user 1 (SU1) frame 1708 colliding with the first two preamble transmissions. However, the random access transmissions may act as interference to this frame resulting, for example, in a failed transmission. When SU1 may try to retransmit, the medium may be busy carrying the repeated preamble sequence. Both the WTRU 1706 and a base station 1710 may know the size of the random access transmit window. Such a window may be sized based on the type of secondary user interference that the LTE system may be trying to control. For example, this may depend on the largest WiFi frame size.

Figure 18:
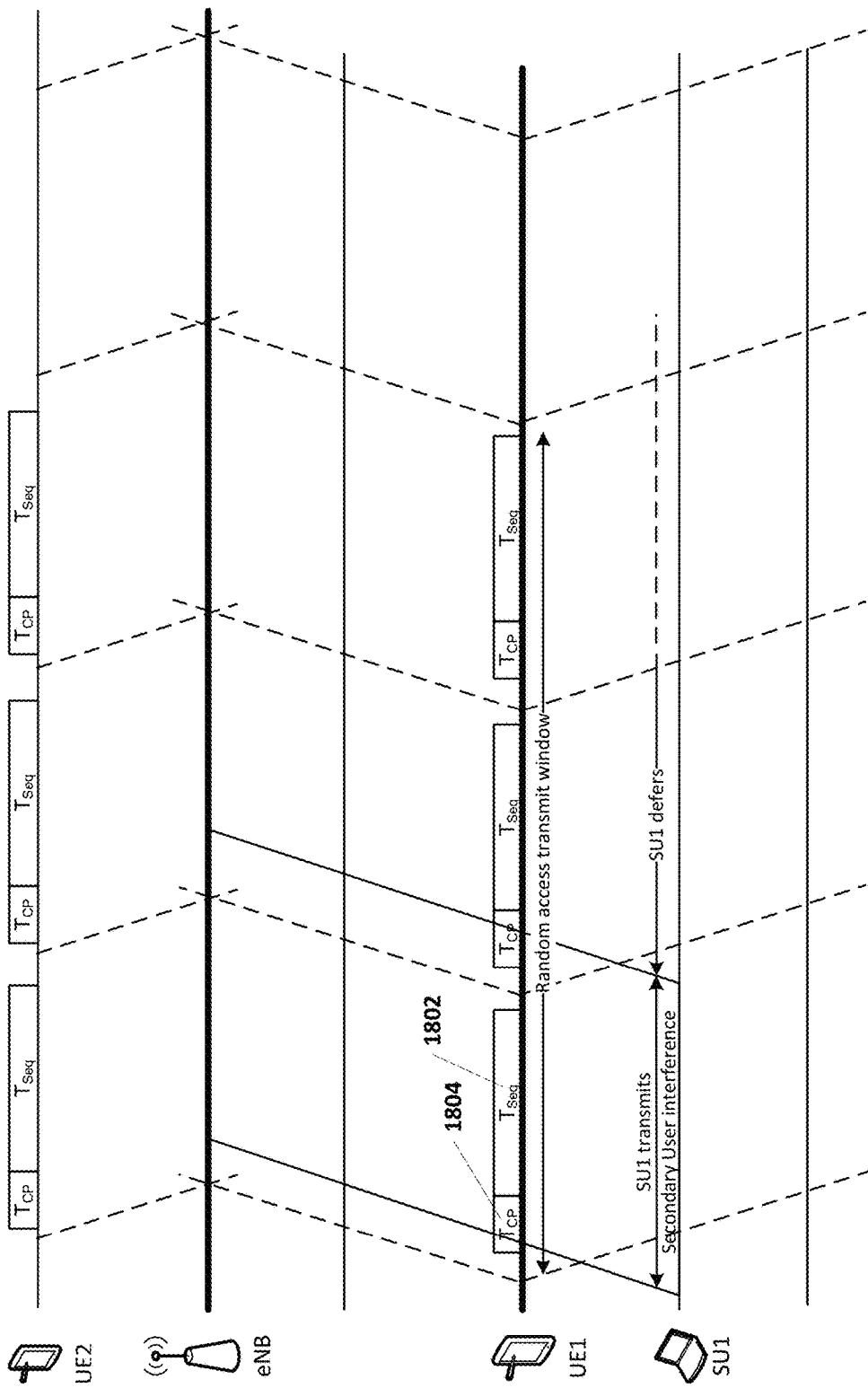
FIG. 18 depicts an example of non-continuous repeated random access transmissions.

A random access procedure or method described herein below may also be used or provided. For example, repeated transmissions may be non-continuous. FIG. 18 shows an example of repeated random access transmission that may be non-continuous. For example, each transmission may be within a single subframe. The interval between retransmissions may prevent secondary users from acquiring a medium (e.g., if the secondary user may be WiFi, the interval may be less than DCF inter-frame spacing). A format may be provided that may repeat a random access transmission K times, where each transmission may have the same preamble 1802 of duration $T_{seq}$ and may be preceded with its own cyclic prefix 1804 of size $T_{CP}$. The transmissions may be in consecutive subframes or every N subframes where N may be determined based on the type of secondary user interference.

A random access procedure or method described herein below may also be used or provided. For example, the communication system may alter the manner in which random access transmissions may be sent such that the probability that secondary users may be silent for at least part of the random access transmission may be increased. A WTRU and base station may be aware of one or more of the following: a size of the random access transmission window; the LTE resource blocks reserved for the random access transmissions; the timing of the random access transmission window (e.g., the specific subframes and the frequency at which such a random access transmission window repeats); the details of the preamble format, the number of repetitions (K); the available preambles; the transmit power for the preambles; and/or any other random access related parameters.

Figure 19:
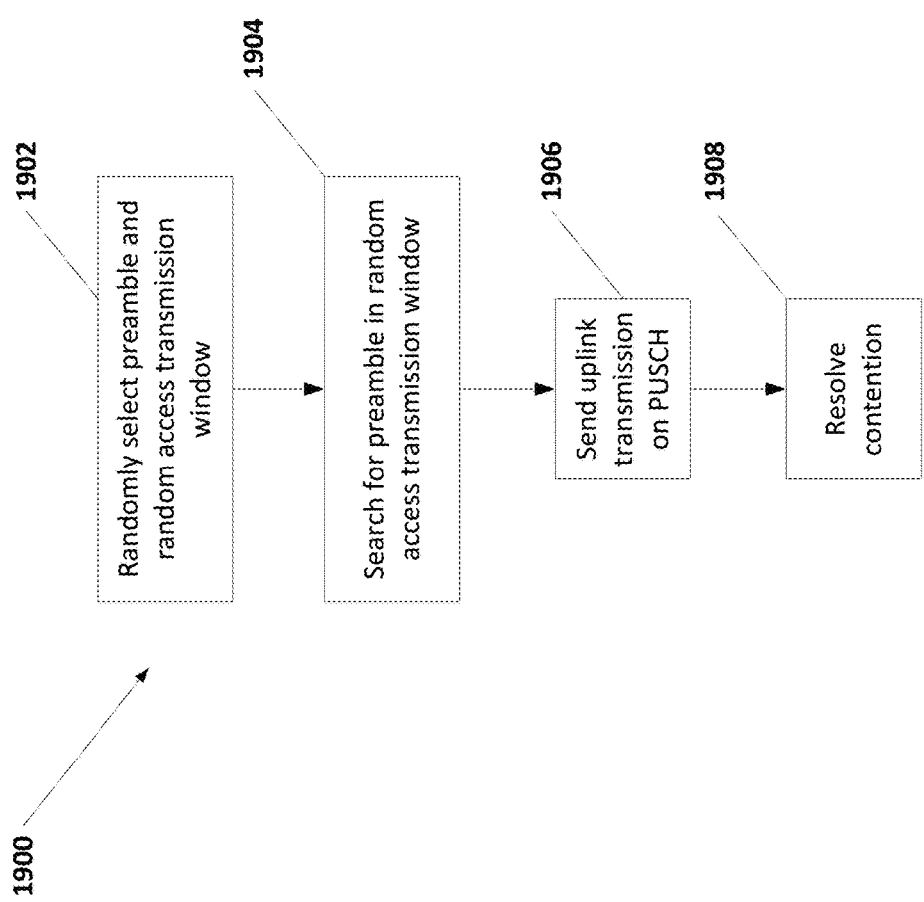
FIG. 19 is a process flow diagram illustrating an example random access method or procedure.

In such a random access procedure or method 1900 as depicted in FIG. 19, at 1902, a WTRU may randomly select a preamble (e.g., from those available) and may randomly select a random access transmission window. The WTRU may select the next available window. The WTRU may determine the transit power to use for the preamble transmissions and may send the preamble ID of the selected preamble K times (e.g., using either continuous or non-continuous repeated random access transmission as shown in FIG. 17 or FIG. 18, respectively). The same preambleID may be repeated in each of the transmissions at the same transmit power. The WTRU may ramp up the power for each retransmission.

Then, at 1904, a base station (e.g., an eNB) may search for the preambles in the random access transmission window. The base station or eNB may find the preamble in any of the K transmissions. The eNB may wait 2-3 subframes after the end of the random access transmission window to schedule a RACH message. This RACH message may include the found or determined preamble ID, a temporary C-RNTI, a timing adjustment message, and/or an uplink grant. At the same time, the WTRU may open up its random access response window a few subframes after the end of the random access transmission window looking for the RA-RNTI and a matching preambleID. The RA-RNTI may use the formula RA-RNTI=1+t_id+10*f_id, where t_id may be the last subframe of the random access transmission window (0, 1, 2, 3, . . . , 9) and f_id may be the frequency index of the random access block used for the random access transmission (0, 1, 2, 3, 4, 5).

The random access procedure or method 1900 may then proceed similarly to 306 and 308 as described herein above in connection with FIG. 3. For example, at 1906, the WTRU may use an UL grant to send an uplink transmission on PUSCH. At 1908, the WTRU may perform contention resolution.

If the preamble transmissions may be unsuccessful, the WTRU may ramp up the transmit power of the preamble and may try again (e.g., as defined in Release 10) with the exception that the retry may again be a transmission of repeated preambles (e.g., using either continuous or non-continuous repeated random access transmission as shown in FIG. 17 or FIG. 18, respectively).

Since the preamble may be repeated K times in each random access transmission window, the base station may use such knowledge to determine that more than one WTRU may have selected the same preamble in a random access resource. If multiple WTRUs transmit the same preamble in the same RACH resource, the resulting collision may not be detectable at 1904 above. Such a collision may be resolved through contention resolution. In the second class of solutions in which the communication system may alter the manner in which random access transmissions may be sent to increase the probability that secondary users may be silent for at least part of the random access transmission, where the preamble may be repeated K times, the base station may detect the collision at 1904 and may take a preventative action. The base station may also try to correlate the preambles across the random access transmission window. During such a window, the base station may detect none, one, or up to K preambles (e.g., for each of the preamble transmissions). The base station may detect a collision (e.g., two WTRUs having selected the same preamble and transmitted in the same random access resource) by observing different timing adjustments across the random access transmission window and/or an odd preamble correlation pattern. For example, a base station may determine that a preamble may be received in sub frame k+0 and k+2 and a missing preamble in subframe k+1 may suggest that the preambles in subframe k+0 and k+2 may be from different WTRUs.

An eNB or base station may resolve the contention by asking the WTRUs to try again at the next window. As such, at 1904, the eNB may respond to the WTRUs on the RA-RNTI (or a RNTI) informing such WTRUs that a collision may have occurred and to retry at a future random access transmission window. Such an attempt may be performed without a power ramp-up and without incrementing the count on the number of random access attempts. At 1904, the eNB may respond on the RA-RNTI with multiple grants (e.g., one for each discerned preamble). Each grant may have its own temporary C-RNTI and timing adjustment. After receiving the two grants, the colliding WTRUs may randomly select one of them (e.g., grants) for transmission of their message, e.g., at 1906. This message may be successful if the WTRU may select the grant that may have the correct timing adjustment.

Preamble sizes used in solutions herein may be similar to, for example, preamble sizes included in LTE Release 10. The solutions described herein may be extended to smaller preamble sizes. Furthermore, the solutions described herein may be readily combined with sensing solutions. For example, in a system where the preamble may be repeated K times, the WTRU may sense a medium after every L transmissions of the preamble (L<K). The sensing may be simple energy detection for a very short period of time. If the medium may be sensed free, the WTRU may proceed with N more retransmissions of the preamble where N may be as small as 1. If the medium may be sensed busy, the WTRU may try with an additional L retransmissions and may then sense again. After the medium may be sensed free, there may be no more secondary user interference and the WTRU may send a few RACH preambles. The WTRU may transmit fewer than K preambles, which may result in less interference to random access transmissions from other WTRUs.

A RACH procedure may be configured to cooperate with a coexistence mechanism, for example, a subframe-based coexistence mechanism. A WTRU may not be aware of one or more associated coexistence gap periods. An eNB may select PRACH resources and/or a RACH response window for one or more WTRUs based on knowledge of the coexistence gap.

The eNB may obtain the coexistence gap information, for example, from a scheduler. The eNB may use the coexistence gap information to choose a PRACH and/or RACH configuration, for example by selecting a "prach-ConfigIndex" and/or RACH response window size ("ra-ResponseWindowSize"). The eNB may send the selected prach-ConfigIndex and/or the selected ra-ResponseWindowSize, for example with an SIB2 message.

Figure 20:
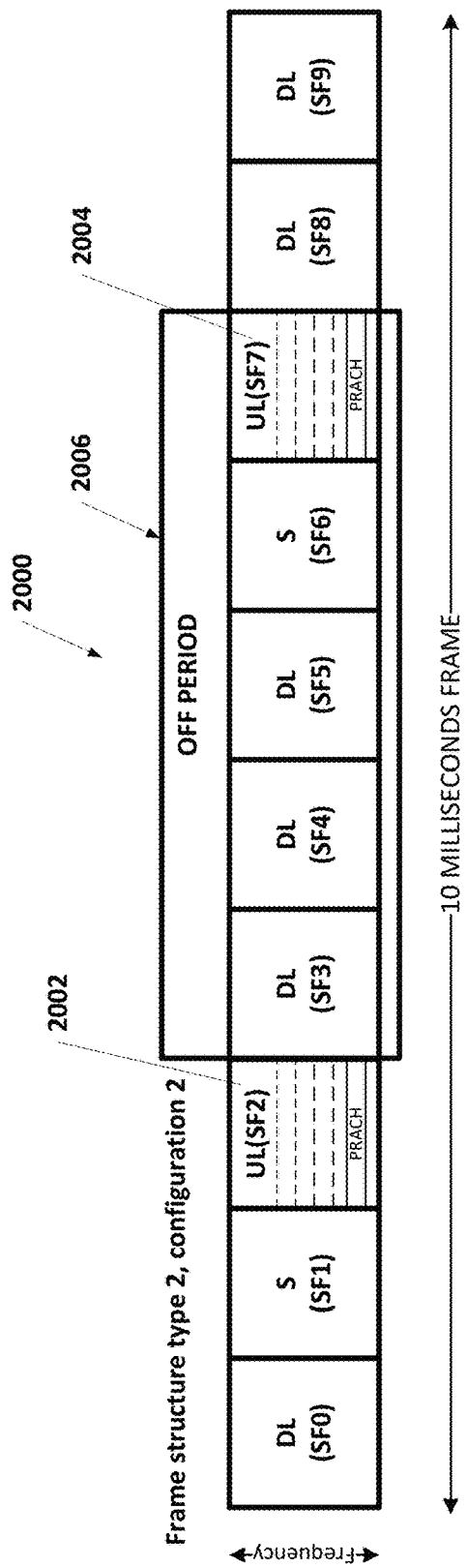
FIG. 20 depicts an example Time-Division Duplex (TDD) frame structure and configuration that may be used cooperatively with a coexistence mechanism.

FIG. 20 depicts an example Time-Division Duplex (TDD) frame 2000. For example, the eNB may select a prach-ConfigIndex such that the WTRU selects subframe 2, depicted at 2002, for preamble transmission. The selected index may avoid subframe 7, depicted at 2004, for example.

One or more WTRUs may read the prach-ConfigIndex. Based, for example, on one or more restrictions indicated in the prach-ConfigIndex, a subframe containing PRACH (e.g., a next available subframe containing PRACH) may be selected for preamble transmission. For example, subframe 2, depicted at 2002, may be selected for preamble transmission.

The eNB may select a ra-ResponseWindowSize to compensate for a gap period, for example, by increasing the window size in accordance with a size of an OFF gap period. The WTRU may listen for the response during the gap period and/or beyond the gap period.

If the coexistence gap period changes, the eNB may select a different PRACH configuration, for example, by selecting a different prach-ConfigIndex and/or ra-ResponseWindowSize. The selected prach-ConfigIndex and/or ra-ResponseWindowSize may comprise an IE that may be sent with an updated SIB2, for example. For example, a SIB2 may be changed in accordance with 160 millisecond intervals and/or may be repeated in accordance with 20 or 40 millisecond intervals.

Information pertaining to the different PRACH configuration may be sent via physical layer (e.g., Layer 1) signaling of "PRACH resources" and/or "RA Response Window Size" by an eNB. For example, a WTRU may wake up in accordance with one or more DRX cycles and may read one or more synchronization signals, for example a Primary Synchronization Signal (PSS) and/or a Secondary Synchronization Signal (SSS). A relative position of the PSS and/or the SSS may be used to indicate PRACH resources. The position of the reference signal may be unique in a cell and may be related to a Cell ID. For example, cell-specific Reference Signals (RSs) may be provided for 1, 2, and/or 4 antenna ports. Six cell-specific frequency shifts may be configured. RS positions may be used as an indication of PRACH resources.

Information pertaining to the different PRACH configuration may be sent in accordance with a SIB2 scheduled transmission change. For example, an eNB may change the PRACH information in the SIB2 when it is repeated in accordance with 20 millisecond intervals. The eNB may send an "SI change indication" with the MIB that may indicate that the PRACH information has changed and that the WTRU may limit reading of the SIB2 to one or more portions pertaining to the PRACH information. For example, a WTRU may wake up during a DRX ON period and, if the SIB2 change indication is present, may read the PRACH information.

A RACH procedure may be configured to cooperate with a coexistence mechanism, for example, a subframe-based coexistence mechanism. A WTRU may be aware of one or more associated coexistence gap periods. For example, a WTRU may be made aware of one or more configurations pertaining to the RACH procedure and/or coexistence mechanism. In addition to the co-existence mechanism, there may be one or more silent periods, for example due to eNB Discontinuous Transmission (DTX) for power savings. The WTRU may be configured to decide how to coordinate between the RACH procedure and/or coexistence mechanism, for example.

Figure 21:
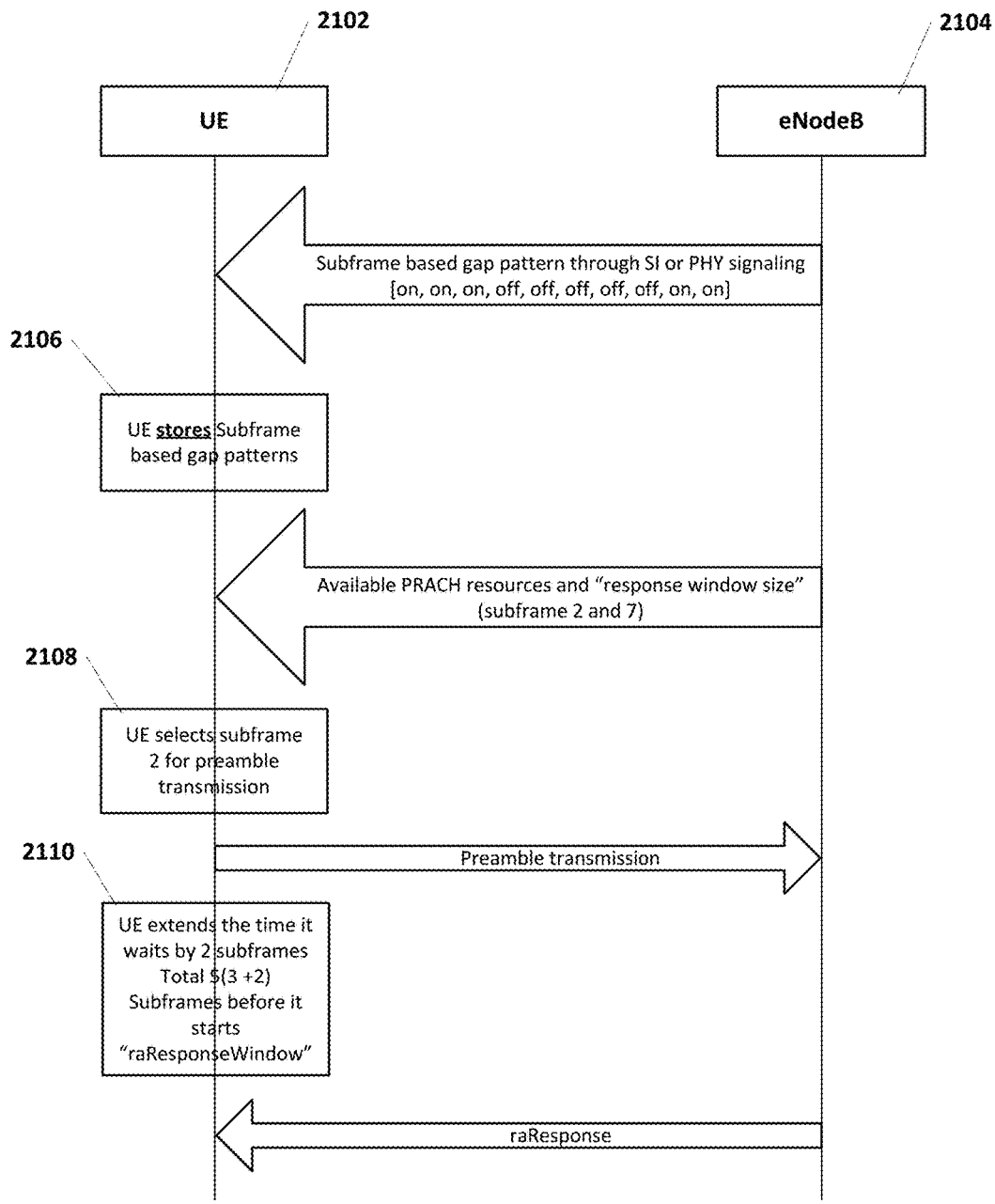
FIG. 21 depicts an example information exchange between a WTRU and an evolved Node B to coordinate a RACH and a coexistence mechanism.

The example TDD frame structure and configuration depicted in FIG. 20, having a gap off period 2006 of five subframes, may be used. FIG. 21 depicts an example information exchange between a WTRU 2102 and an eNB 2104 that may be implemented to coordinate a RACH and a coexistence mechanism.

A WTRU may be made aware of one or more coexistence gap patterns, for instance using broadcast messages and/or PHY signaling. For example, a WTRU may know which subframes in the configuration shown in FIG. 20 are On and which subframes are Off. As depicted in FIG. 20, subframes 0, 1, and 2 are On, subframes 3, 4, 5, 6, and 7 are Off, and subframes 8 and 9 are On. This pattern may produce a fifty percent (50%) duty cycle. The WTRU may store the subframe-based gap patterns at 2106 of FIG. 21.

One or more WTRUs may know about the available PRACH resources (e.g., UL subframes 2 and 7 depicted in FIG. 20 have allocated PRACH resources) using a mechanism such as a "prachConfiguration Index" sent in an SIB2, for example.

A WTRU may first select a subset of PRACH resources, which may not fall in the gap, from the available PRACH resources. The WTRU may select PRACH resources in subframe 2, for example. If there are multiple resources in subframe 2, the WTRU may randomly select a PRACH resource from the subset of PRACH resources for preamble transmission at 2108 of FIG. 21. The WTRU may also select a PRACH opportunity in a next frame, for example to avoid collision probability.

The WTRU may obtain an "RA Response" window size from the eNB. Based on the gap information, the WTRU may take one or more of the following actions. The WTRU may wait to start a response window until a next available DL subframe outside of an OFF period. For example, in accordance with the illustrated example, as illustrated in FIG. 20 and at 2110 of FIG. 21, the WTRU may wait 5 (=3+2) subframes, before it starts the response window. The WTRU may extend the RA Response window so that it includes the OFF period. The WTRU may monitor a response window that may be split across multiple frames. The response window may be limited to subframes that are DL subframes, for example subframes 0 and 1.

The eNB may halt its activity during the OFF period and may resume from where it left during a subsequent ON period. The WTRU may not inform the eNB about the extended RA Response Window size.

If the WTRU is unable to find PRACH resources outside the coexistence gap OFF periods for N consecutive number of subframes, it may attempt cell reselection. As part of the cell reselection procedure, the WTRU may monitor the availability of PRACH resources and may initiate a cell reselection if this availability falls below a threshold. PRACH resource availability may be measured by monitoring the number of PRACH opportunities in a moving window, for example.

A RACH procedure may need to integrate with a "transparent frame" based Coexistence Mechanism. For example, coexistence gaps may be introduced with a minimal impact on HARQ and/or other transmission timing rules by causing the coexistence gaps to span an integer number of frames. Because the TDD UL/DL configuration may be repeated (e.g., in each frame), in accordance with a gap that spans substantially the entirety of a frame, the timing and/or rules of the TDD HARQ may be adapted in such a way that one or more timings (e.g., all timings) may be skewed by an integer number of frames.

The WTRU may be made aware about the configurations of the RACH procedure and/or the transparent frame information for coexistence gaps. The PRACH resource selection may involve a two-part process, for example selection within a frame and then selection of a frame. The WTRU may select PRACH resources within a frame based on information sent by eNB. The same PRACH resources may be available in one or more frames (e.g., in every frame). The WTRU may then select a frame (e.g., randomly) from the frames in which transmission is allowed (e.g., not a transparent frame), to send the RACH preamble. The selection may be limited to the next K frames where transmission is allowed, for example. The WTRU may re-evaluate a path loss parameter for one or more RACH retransmissions (e.g., for each RACH retransmission).

The WTRU may obtain an "RA Response" window size from an associated eNB. After sending the RACH preamble and four subsequent subframes, for example, the WTRU may start counting the "RA Response" window. If the window extends to the next frame, which may be a transparent frame, the WTRU may take one or more of the following actions. The WTRU may stop counting the window for the complete "transparent frame." Once the frame is over, the WTRU may restart the counter. The WTRU may extend the RA Response window so that it includes the total "transparent frame" period. The WTRU may start the RA Response window at a next frame in which transmission is allowed.

The eNB may halt its activity during the OFF period and may resume from where it left during the ON period. The WTRU may not inform the eNB about the extended RA Response Window size.

An eNB may be configured to modify a RACH capacity. For example, an eNB may monitor the PRACH resources remaining after one or more coexistence gap OFF periods. If the available PRACH resources are low, the eNB may increase the number of PRACH resources. The eNB may maintain a constant average number of resources over a given time period. For example, in accordance with frame structure type 2 with preamble formats 0-4, there may be multiple random access resources in an UL subframe (or UpPTS for preamble format 4) depending on the UL/DL configuration, for example. There may be a maximum of 6 PRACH resources, which may correspond to 36 (6×6) resource blocks in a subframe and/or $0 \le f\_id < 6$. When a subframe-based coexistence gap is introduced, the eNB may increase allocation of PRACH resources in a subframe (e.g., from 6 to 12 resource blocks) if UL frames are lost to coexistence gap periods, for example.

A communication system, such as a standalone LTE TVWS system, may operate in an environment where there may be various sources of interference. Such sources of interferences may include primary users, such as DTV and/or microphone users, and/or secondary users, such as WiFi, LTE system users, and the like. According to an example, WTRUs may camp on a single cell after powering up, e.g., using a LTE Release 10 procedure. The cell may be crowded with other LTE systems and secondary users generating significant co-channel interference. As such, initial access for WTRUs using the RACH procedure may use a large number of attempts compared to a licensed band operation, such that the overall "initial access" time for WTRUs in an LTE TVWS system may increase.

For carrier aggregation (CA) capable WTRUs, the probability of a successful random access attempt may be increased if the random access may be attempted in more than one carrier frequency. If the WTRUs may successfully complete the RACH procedure with fewer attempts, then such WTRUs may get access faster than WTRUs without CA capability in LTE TVWS system.

Additionally, when a WTRU may be switched on, the WTRU may scan RF channels in the specified bands according to its capabilities to find available PLMNs. On each carrier frequency, the WTRU may look for the strongest cell and read its system information. Using the system information, the WTRU may find out which PLMN(s) the cell belongs to. If the WTRU may read one or several PLMN identities in the strongest cell, each PLMN (e.g., found PLMN) may be reported to a NAS. The NAS may select a suitable PLMN from a list. Once the WTRU has selected a PLMN, the cell selection procedure may be performed to select a suitable cell for the PLMN to camp on. The WTRU may further select a suitable cell based on idle mode measurements and cell selection criteria.

According to additional examples, CA capable WTRUs may transmit and receive simultaneously in two different channels. Thus, instead of camping on one cell, the WTRU may select more than one cell from the list of measured cells. Additionally, the WTRU may choose the highest ranking N number of cells from the list. N may be in a range of $1 < N \le 6$ (e.g., since the maximum number of carriers for aggregation may be restricted to 5).

Figure 22:
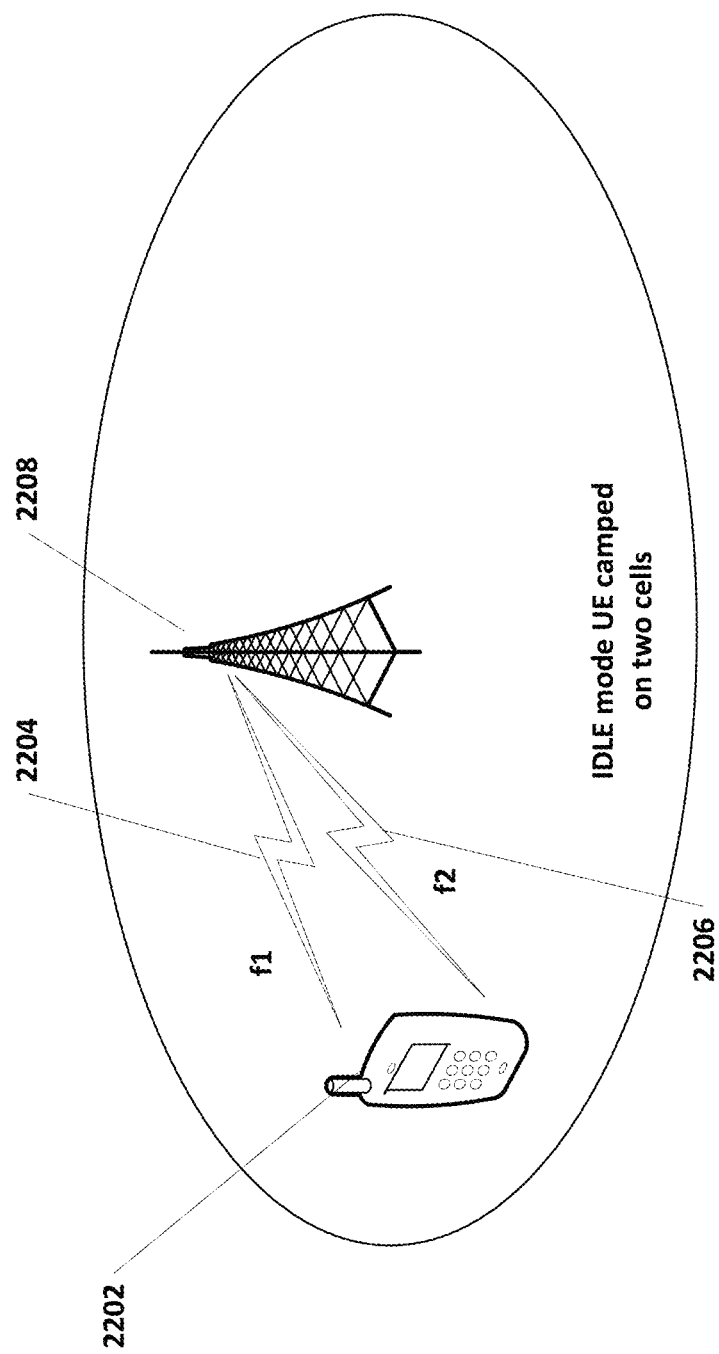
FIG. 22 depicts an example of a WTRU in idle mode that may be camped on one or more cells.

As shown in FIG. 22, a WTRU 2202 may camp on two cells on two different carrier frequencies 2204 and 2206. The WTRU 2202 may read the "Broadcast information (SIB2)" on both of the cells and may get the information about the available PRACH resources on each of the cells. The two cells may belong to the same eNodeB 2208 or may be from two different eNodeBs. After the WTRU 2202 may successfully camp on two cells, the WTRU 2202 may start a RACH procedure on both of the cells.

Figure 23:
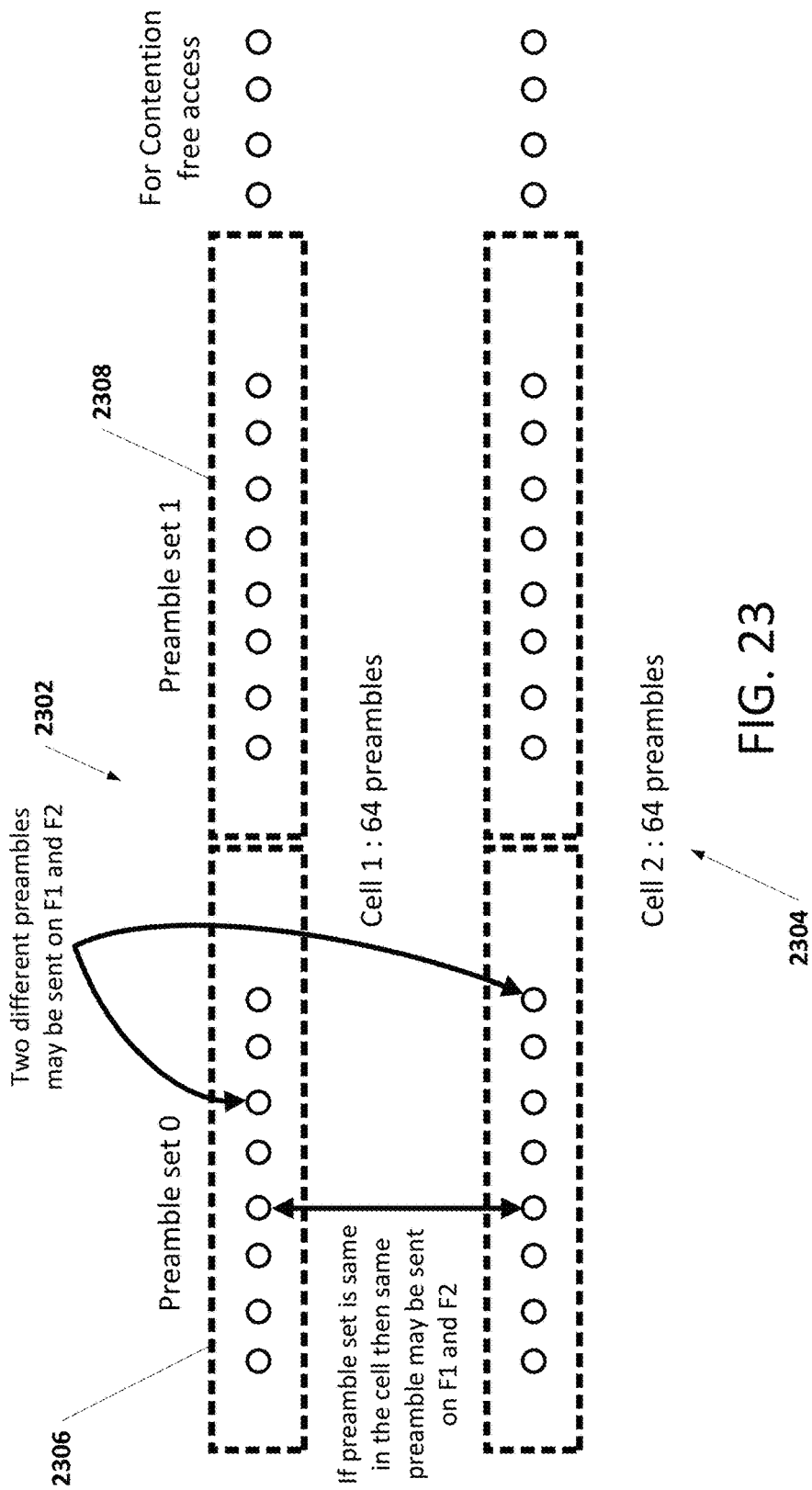
FIG. 23 depicts an example of preambles such as RACH preambles that may be used for one or more carriers.

To start the RACH procedure (e.g., at 302 of the RACH procedure 300 of FIG. 3), a WTRU may select a RACH preamble for both carriers, e.g., cells 2302 and 2304 of FIG. 23. In the broadcast information of each cell, the WTRU may be signaled two subsets 2306 and 2308 that may include 64 preambles as shown in FIG. 23.

A WTRU may also choose randomly a single preamble to be used over both carriers (e.g., since the L3 message size is the same) and/or two different RACH preambles that may be used over two different carriers (e.g., at 302 of the RACH procedure 300 of FIG. 3).

Figure 24:
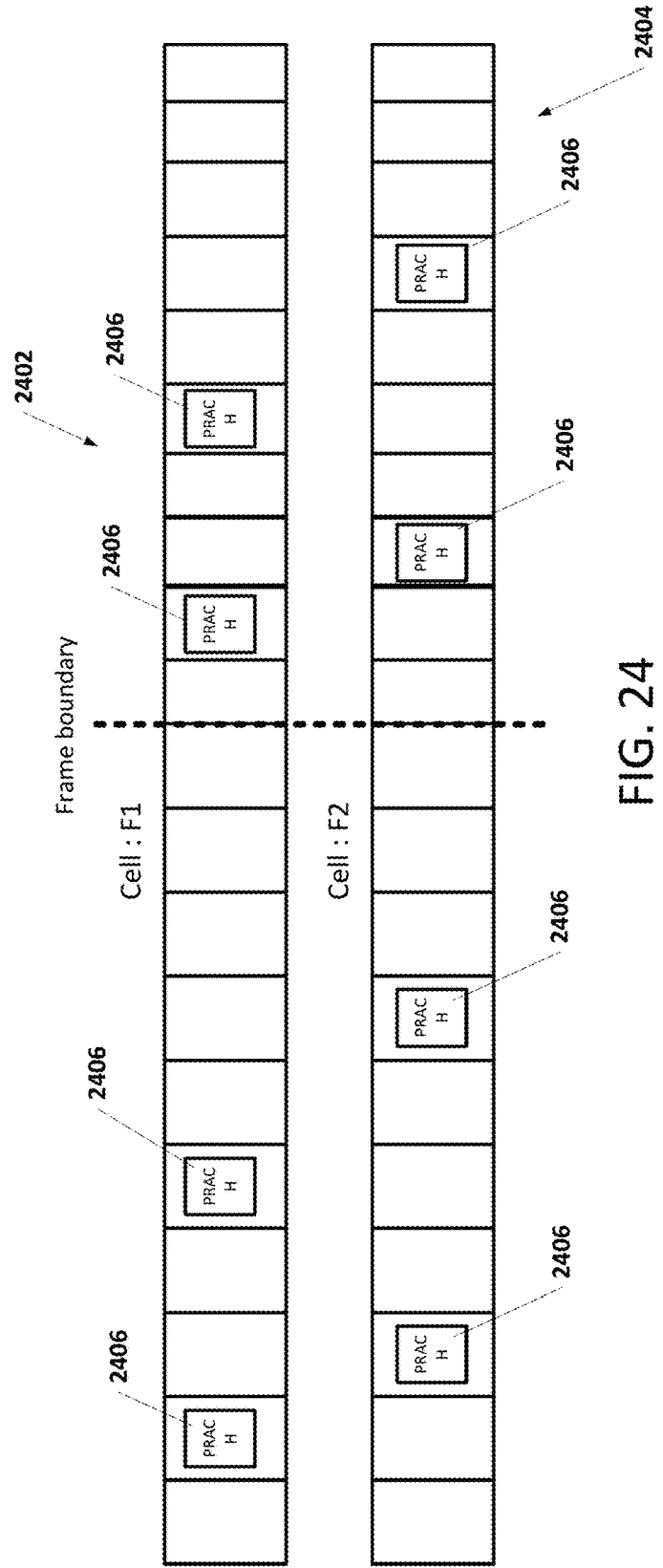
FIG. 24 depicts an example of preambles such as RACH preambles, for example, staggered in time on one or more carriers.

Format information may then be sent in the broadcast information (e.g., as part of 302 of the RACH procedure 300 of FIG. 3). The base station or eNB may request to use the same format information on both carriers. If the two carriers are from two different sites, then the format may be different. The WTRU may also determine the power to be used for the preamble transmission on both carriers. The WTRU may further select the PRACH opportunity for both carriers. An eNB or base station may design the PRACH resources in the two cells in such that the cells may be separated in time as shown in FIG. 24. FIG. 24 illustrates two cells 2402 and 2404 having PRACH resources 2406 separated in time between the two cells 2402 and 2404.

A WTRU may send a preamble on cell 2402 and then send the preamble on cell 2404. The MAC layer may coordinate to make sure that the opportunities chosen may have sufficient time separation, e.g., if PRACH in subframe 1 may be chosen for cell 2402, then for cell 2404, it may be better to choose subframe 6 for preamble transmission. The probability of avoiding secondary user interference may increase. Additionally, the preamble transmission may include different RA-RNTI on the two cells.

A WTRU may sense the channel on cell 2402. If the channel may be available, then the WTRU may send the preamble on cell 2402 and may not attempt to send the preamble again on cell 2404. If the channel may not be available, then the WTRU may wait and send the preamble in the next opportunity on cell 2404.

Figure 25:
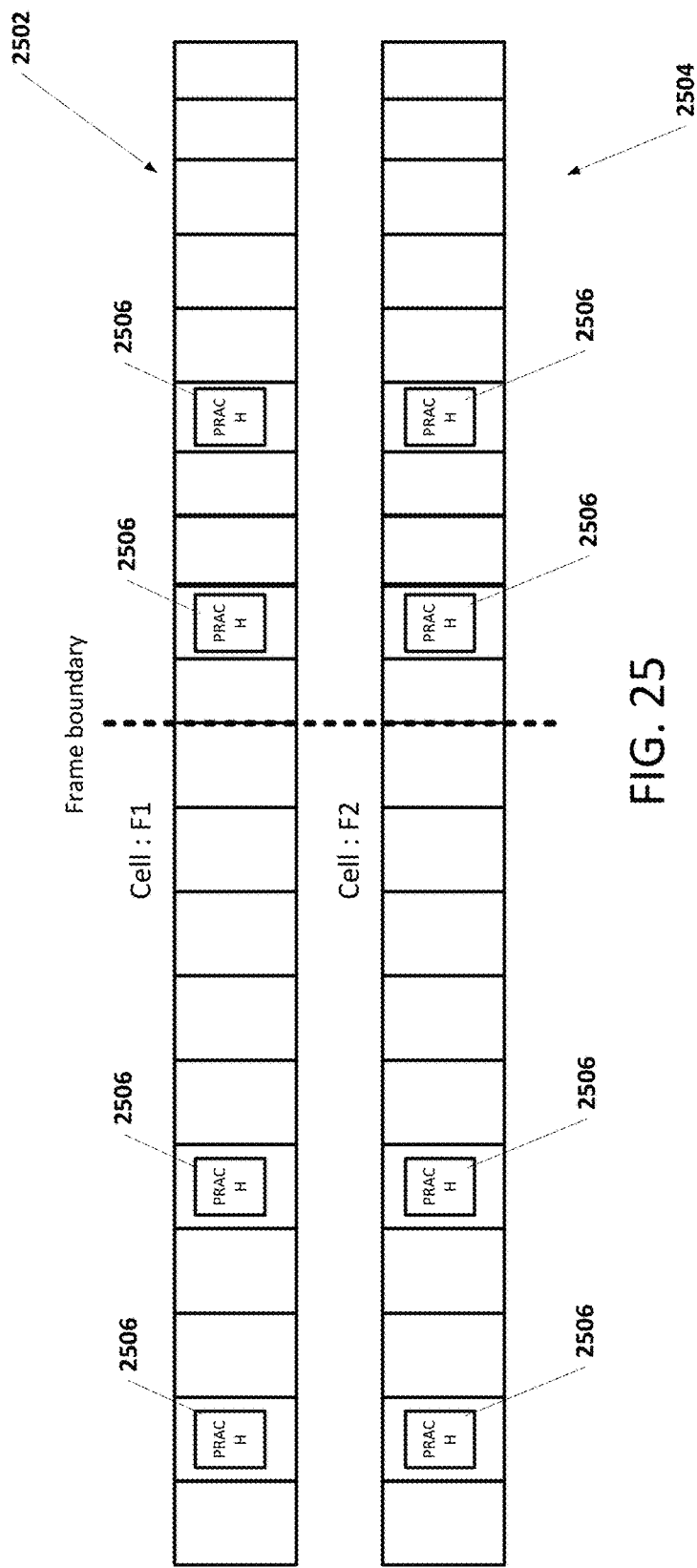
FIG. 25 depicts an example of preambles such as RACH preambles, for example, time synchronized on one or more carriers.

FIG. 25 illustrates two cells 2502 and 2504 that may have PRACH resources 2506 that may not be separated in time. If the PRACH resources 2506 may not be separate in the time domain for both the cells 2502 and 2504 as shown in FIG. 25, then the WTRU may choose to transmit the preamble within the same time opportunity (e.g., also at 302 of the RACH procedure 300 of FIG. 3). The WTRU may use same RA-RNTI in such an example.

The WTRU may then start monitoring the PDCCH on both the carriers such that the WTRU may get RA response within the "RA Response Window" time frame (e.g., at 302 of the RACH procedure 300 of FIG. 3).

An eNB may successfully receive the RACH preamble from both the carriers or from either one of the carriers (e.g., at 304 of the RACH procedure 300 of FIG. 3). For example, an eNB may be able to successfully receive the RACH preamble from both the carriers (F1 and F2, e.g., cells 2502 and 2504 of FIG. 25) and depending on the link condition, it may choose to send the RA Response on the better link between the two links (F1 or F2). Additionally, an eNB may be able to successfully receive the RACH preamble on one carrier (e.g., F1) where the link condition of that carrier (e.g., F1) may be good and the WTRU may send the RA response on that carrier (e.g., F1). An eNB may be able to successfully receive the RACH preamble on one carrier (e.g., F1) where the link condition of that carrier (e.g., F1) may not be good and the WTRU may send the RA response on another carrier (e.g., F2).

According to an example, different RA-RNTIs may be used by the WTRU on two cells. For example, RA-RNTI-1 may be sent on carrier F1, e.g., cell 2502 of FIG. 25, and RA-RNTI-2 may be sent on carrier F2, e.g., cell 2504 of FIG. 25. The WTRU may receive RA-RNTI-1 on cell 2504 or RA-RNTI-2 on cell 2502. To handle such examples, the WTRU may listen for the two RA-RNTIs (e.g., RA-RNT-1 & RA-RNTI-2) on a PDCCH of both carriers (e.g., cells 2502 and 2504 of FIG. 25). If different preamble IDs may be used, a WTRU may match against the two preamble IDs (e.g., after RA-RNTI decoding).

Based on the examples described above and the RACH opportunity selected by the WTRU for preamble transmission, an eNB and the WTRU may have to handle one out of four possible combinations of RA-RNTI and Preamble Id on the two cells (e.g., F1 and F2, or cells 2502 and 2504 of FIG. 25) including: same RA-RNTI, same Preamble ID; same RA-RNTI, different Preamble ID; different RA-RNTI, same Preamble ID; and/or different RA-RNTI, different Preamble ID.

Based on the outcome of RA-RNTI search and Preamble ID matching, the WTRU may know which carrier the UL grant and the timing advance command to be used (e.g., at 304 of the RACH procedure 300 of FIG. 3). For example, the WTRU may receive a RA-RESPONSE with RA-RNTI-1 on carrier F2 (e.g., cell 2504 of FIG. 25), may be able to process the message, and may know that the "UL grant" and the "timing advance" command may have to be applied on carrier F1 (e.g., cell 2502 of FIG. 25). The WTRU may attempt to apply the timing advance command on carrier F1 and process the UL grant for carrier F1. Subsequently, carrier F1 may be made the Primary Component Carrier (PCC) by the WTRU. Additionally, the WTRU may assume the RACH procedure to be successful and may terminate the RACH procedure on carrier F2 such that operations on carrier F2 may be shut down and the WTRU may go back to the state where it is camping on a single cell.

According to an example, the contention resolution process may then continue on carrier F1. The procedure may then continue as per 306 and 308 of the RACH procedure 300 of FIG. 3.

A WTRU may be allocated a certain Transmit Power level per 100 m-by-100 m pixel area (e.g., under OFCOM for TVWS). Such an allocation may affect a RACH, because a mobile device (e.g., a WTRU or other component of a communication system) that wants to access a TVWS channel may have to assume a conservative "safe" transmission power until it receives information about the power limit at its current pixel.

An eNB may broadcast the power allocation information and the mobile device (e.g., a WTRU or other component of a communication system) may use its own geo-location capability to determine the correct transmit power. A mobile device (e.g., a WTRU or other component of a communication system) may submit its geo-location information to the eNB, using a minimum safe transmit power and then may receive its power allocation in a base station response. Such solutions may be described in more detail below.

Figure 26:
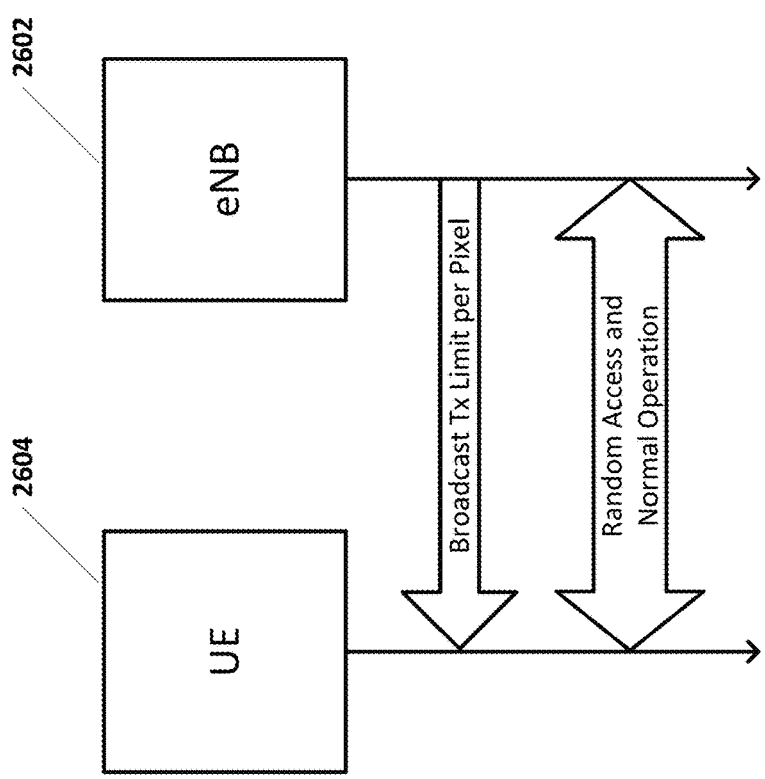
FIG. 26 depicts an example of providing pixel location information in a communication system, such as a LTE system.

For example, as shown in FIG. 26, an eNB 2602 may broadcast the transmit (Tx) power limits for each pixel. Such information may be carried in the system information (e.g., system information blocks (SIB)) and may be broadcast for reception by a WTRU 2604 attempting to access the network or attempting to validate its transmit power allocation information. After reception of the system information (e.g., SIBs), the WTRU 2604 may know what power level to transmit at in its current location.

Variations in this example may also be provided and/or used. For example, the system information (e.g., SIB) may include the transmit power limit for every pixel within its coverage area along with Latitude and Longitude of each pixel and bits to distinguish the available power levels. The eNB 2602 may broadcast its own location information in the form of Latitude and Longitude. To save bits, the eNB 2602 may also transmit the location information of each pixel in terms of relative position. Although pixel locations may be absolute, for example, in terms of latitude and longitude, it may be easier to express them in terms of relative position to save bits. Additionally, the location information may be in polar coordinates in the form (longitude offset, latitude offset), for example (2,2) may indicate or mean 2 pixels north and 2 pixels east of a base station. Such methods may or may not be used with circular coverage area around the base station. As such, using polar coordinates or any other radial method may be used to indicate the relative location in fewer bits.

To save system information (e.g., SIB) resources, the system information (e.g., SIB) may include the worst-case transmit power limit for a subset of all pixels in the cell. A pixel subset may be defined by quadrant (e.g., a range of all pixels directly east to all pixels directly north for example), by radius (e.g., a range of all pixels from 100 m to 200 m for example), or a subset may be the whole cell. The WTRU 2604 may then begin the RACH procedure using such a worst-case power limit. When the WTRU 2604 may have the option to connect to multiple cells, the WTRU may prefer the cell with the higher worst-case transmit power limit.

Figure 27:
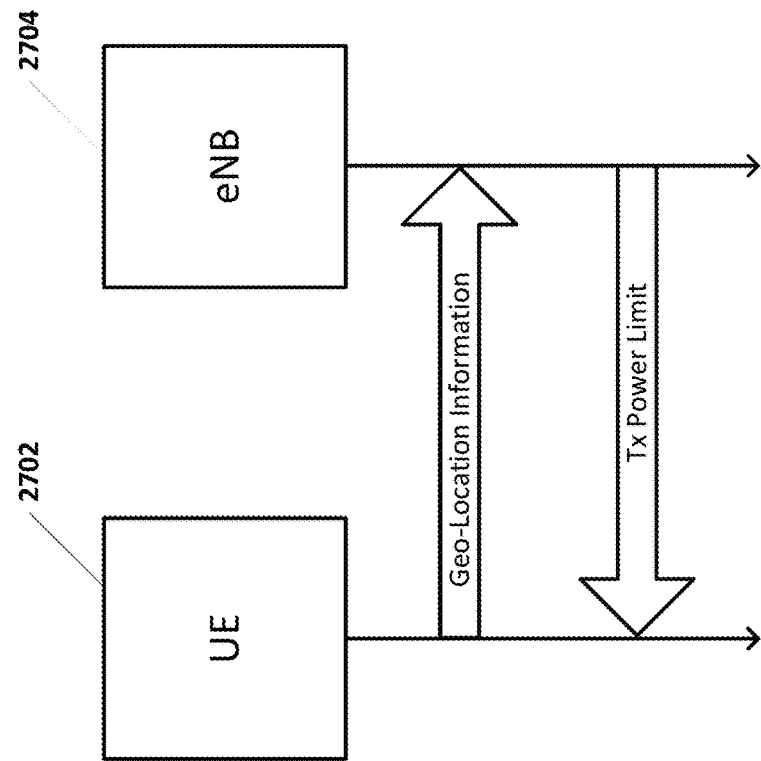
FIG. 27 depicts an example of providing power limit information in a communication system, such as a LTE system.

As shown in FIG. 27, a mobile device 2702 (e.g., a WTRU or other component of a communication system) may submit its geo-location information to an eNB 2704 using a minimum safe transmit power and then may receive its power allocation in response. Such an implementation may be well suited for cases where the RACH preamble may recoverable at the eNBs, at a power lower than that that may be used for PDU transmission. This may be used, for example, where the preamble transmission may be made very robust.

For example, a WTRU may encode its pixel location in the Random Access Preamble. The WTRU may encode a random 6-bit WTRU ID message that may be staggered in the RACH channel space (e.g., in LTE Release 10). The available combinations of channel staggering may encode the RA-RNTI. Such bits may be modified to identify the pixel locations relative to a base station (or eNB). This modification may not break the random access purpose of such bits, as WTRUs in different pixels may still be sending different bits. Within the same pixel, the staggering may be used for additional random access.

Additionally, a calculation of an estimated number of pixels per cell may be used to determine or calculate how many bits may be used for pixel indication. For example, pixels of 100×100 m squares may be used (e.g., as defined by OFCOM). Based on the coverage radius of the cell, the number of pixels per cell may be estimated. For example, in a picocell with a radius of 300 m, the approximate number of pixels may be calculated as follows: Area of Cell/Area of Pixel=(3.14·300·300 $m^2$ per cell)/(100·100 $m^2$ per pixel)= 28.26 pixels. The geometry of the pixels meshing with the geometry of the picocell may also be provided or used. Additionally, there may be a few corners at the edge of the cell that may not be covered by the 30 pixels from such calculation and five bits may be used to encode 32 different possible pixel locations.

As such, for a picocell, five bits may encode the pixel location, and a sixth bit may indicate that the WTRU resides in a corner case. The staggering combinations may then be used for random access purposes within each pixel.

Figure 28:
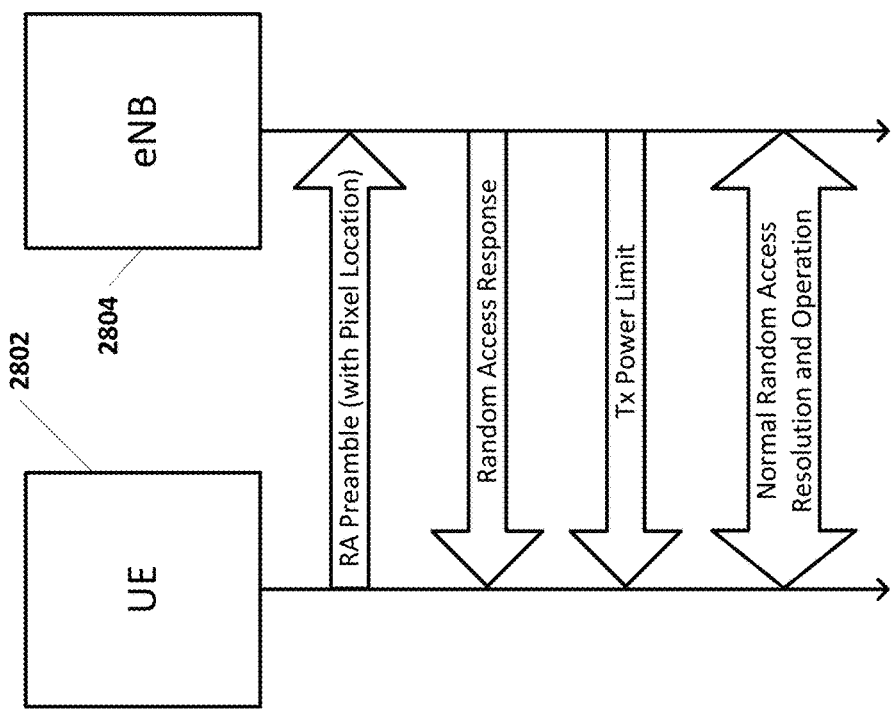
FIG. 28 depicts an example of providing pixel location information in a preamble such as a RACH preamble that may be used in communication system, such as a LTE system.

The pixel information may be encoded using specific combinations of consecutive preamble transmissions (e.g., as shown in FIG. 28 between a WTRU 2802 and an eNB 2804) where each combination of preambles may correspond to a specific pixel.

Figure 29:
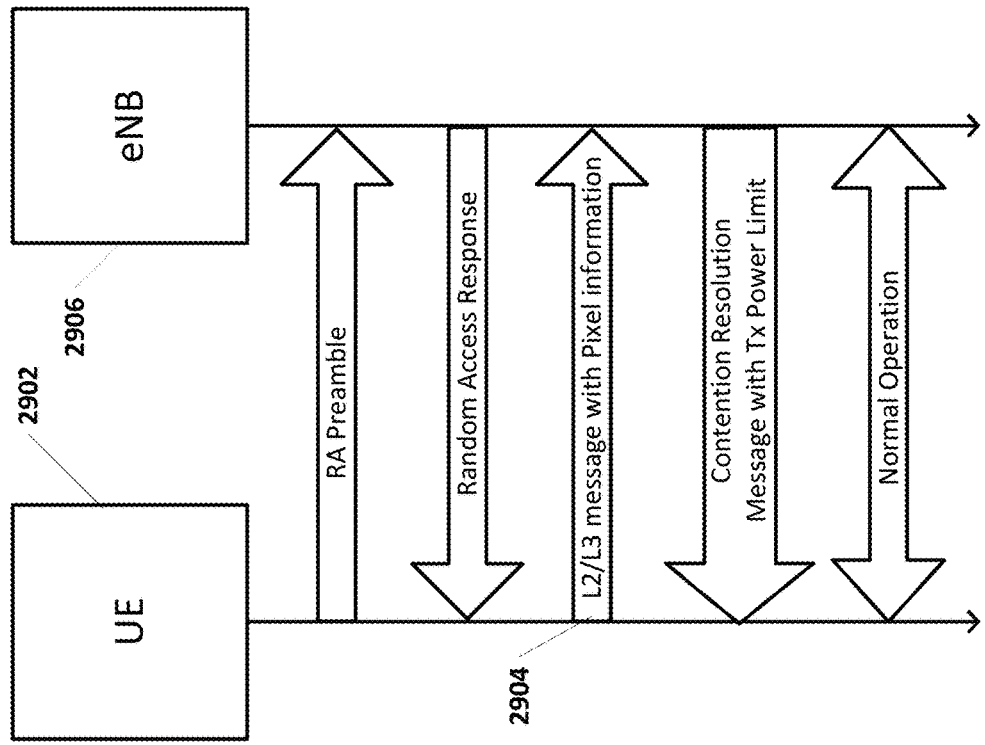
FIG. 29 depicts an example of providing location information in a L2/L3 message that may be used in a communication system, such as a LTE system.

As shown in FIG. 29, a WTRU 2902 may encode the pixel location information within an L2/L3 message shown at 2904 that may be sent to an eNB 2906. For example, in current solutions, WTRUs from the same pixel may use the same initial identity. However, in some cases (e.g., such as cars coming out of a tunnel), it may not be possible for performance reasons. As such, the geo-location information may be sent on the L2/L3 message.

Figure 30:
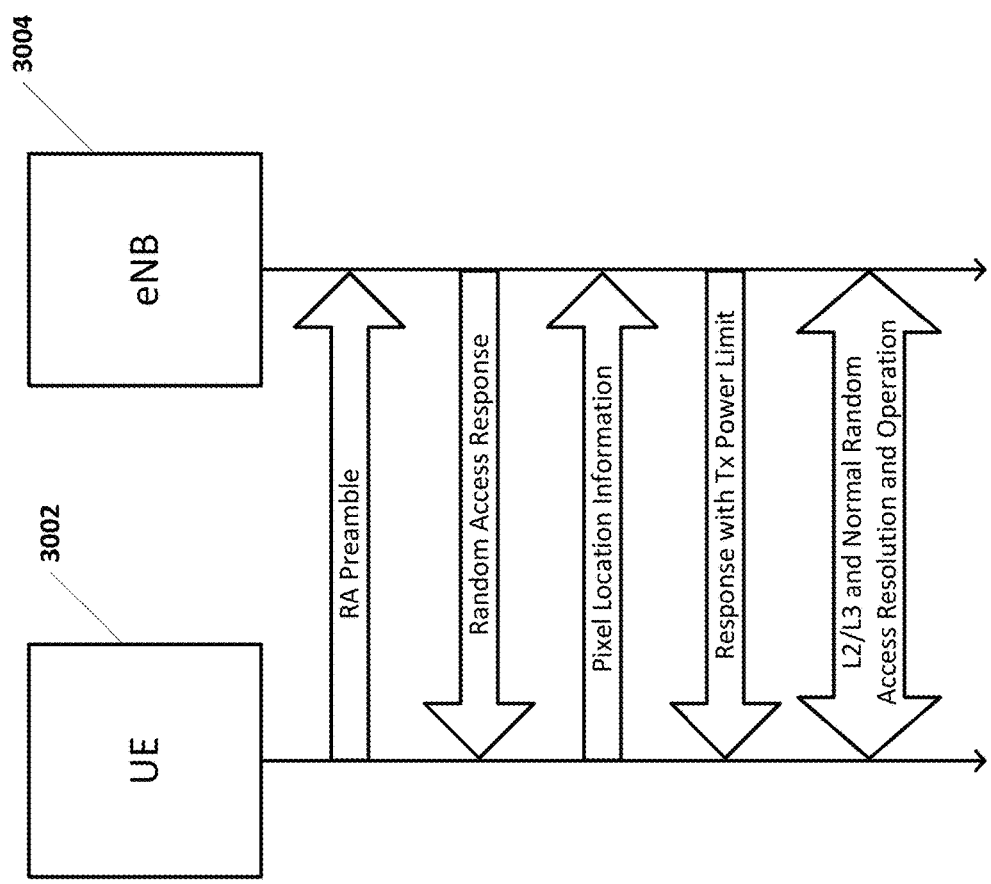
FIG. 30 depicts another example of providing pixel location information in a communication system, such as a LTE system.

As shown in FIG. 30, depending on the context of the L2/L3 message (e.g., RRC connection request, TA update, scheduling request, and the like), there may not be enough space on a PUSCH resource that may be allocated for the L2/L3 message. A message, such as a new message, may be sent that may hijack the L2/L3 uplink resource for the purpose of transmitting the location data to the eNB. Since a WTRU 3002 may suffer from a robustness issue on the UL-SCH, the WTRU 3002 may transmit multiple copies of the location data over the uplink allocation. An eNB 3004 may recognize the pixel location message and may respond with a grant for another uplink resource for the L2/L3 along with the transmit power limit. Such a grant or information may be sent in the form of a second Random-Access Response except with transmit power limit information instead of timing adjustment information. If other WTRUs may be in contention, the eNB 3004 may decide to resolve the contention for the other WTRUs first. The first WTRU 3002 may then restart the process by sending a new RA preamble.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer. Features and/or elements described herein with reference to an eNB or eNodeB and/or a WTRU or WTRU may not be limited thereto and may be implemented using any suitable components of a communication system, for example an LTE system.

What is claimed:

1. A method for a wireless transmit/receive unit (WTRU) to perform random access, the method comprising:
    determining a value for a random access channel (RACH) factor;
    determining a value of a preamble parameter based on the determined value for the RACH factor; and
    sending at least one RACH preamble based on the determined value of the preamble parameter.

2. The method for claim 1, wherein the RACH factor comprises a remaining time of a RACH attempt, and the preamble parameter is a number of repetitions for sending the at least one RACH preamble.

3. The method for claim 1, wherein the random access is performed on a plurality of cells comprising a first cell and a second cell, and the method further comprises:
    determining to use the at least one RACH preamble for the first cell and the second cell; and
    sending the determined at least one RACH preamble on the first cell and the second cell.

4. The method for claim 1, wherein the random access is performed on a plurality of cells comprising a first cell and a second cell, and the method further comprises:
    determining to use a first RACH preamble for the first cell and a second RACH preamble for the second cell; and
    sending the determined first RACH preamble on the first cell and the determined second RACH preamble on the second cell.

5. The method for claim 2, wherein the remaining time of the RACH attempt is calculated based on a duration of a RACH subframe and a listen before talk duration.

6. The method for claim 2, wherein the number of repetitions for sending the at least one RACH preamble is determined further based on a size of the at least one RACH preamble.

7. The method for claim 2, wherein the RACH factor is whether an indication of collisions is received by the WTRU, and the preamble parameter is a timing for sending the at least one RACH preamble, wherein based on receiving the indication of collisions, the timing for sending the at least one RACH preamble is randomly determined.

8. The method for claim 5, the method further comprising:
    determining whether a secondary user is present in the RACH subframe during the listen before talk duration, wherein the sending at least one RACH preamble is performed upon a determination that a secondary user is absent in the RACH subframe.

9. A wireless transmit/receive unit (WTRU) configured to perform random access, comprising:
    a processor; and
    a memory in communication with the processor and storing instructions that, when executed by the processor, cause the WTRU to:
        determine a value for a random access channel (RACH) factor;
        determine a value of a preamble parameter based on the determined value for the RACH factor; and
        send at least one RACH preamble based on the determined value of the preamble parameter.

10. The WTRU for claim 9, wherein the RACH factor comprises a remaining time of a RACH attempt, and the preamble parameter is a number of repetitions for sending the at least one RACH preamble.

11. The WTRU for claim 9, wherein the random access is performed on a plurality of cells comprising a first cell and a second cell, and the processor is further configured to:
    determine to use the at least one RACH preamble for the first cell and the second cell; and
    send the determined at least one RACH preamble on the first cell and the second cell.

12. The WTRU for claim 9, wherein the random access is performed on a plurality of cells comprising a first cell and a second cell, and the processor is further configured to:
    determine to use a first RACH preamble for the first cell and a second RACH preamble for the second cell; and
    send the determined first RACH preamble on the first cell and the determined second RACH preamble on the second cell.

13. The WTRU for claim 10, wherein the remaining time of the RACH attempt is calculated based on a duration of a RACH subframe and a listen before talk duration.

14. The WTRU for claim 10, wherein the number of repetitions for sending the at least one RACH preamble is determined further based on a size of the at least one RACH preamble.

15. The WTRU for claim 10, wherein the RACH factor is whether an indication of collisions is received by the WTRU, and the preamble parameter is a timing for sending the at least one RACH preamble, wherein based on receiving the indication of collisions, the timing for sending the at least one RACH preamble is randomly determined.

16. The WTRU for claim 13, wherein the processor is further configured to:
    determine whether a secondary user is present in the RACH subframe during the listen before talk duration, wherein the sending at least one RACH preamble is performed upon a determination that a secondary user is absent in the RACH subframe.

* * * * *